United States Patent
Moriyoshi

(10) Patent No.: US 10,349,071 B2
(45) Date of Patent: Jul. 9, 2019

(54) MOTION VECTOR SEARCHING APPARATUS, MOTION VECTOR SEARCHING METHOD, AND STORAGE MEDIUM STORING MOTION VECTOR SEARCHING PROGRAM

(71) Applicant: NEC Corporation, Minato-ku, Tokyo (JP)

(72) Inventor: Tatsuji Moriyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 247 days.

(21) Appl. No.: 15/109,930

(22) PCT Filed: Jan. 14, 2015

(86) PCT No.: PCT/JP2015/000132
§ 371 (c)(1),
(2) Date: Jul. 6, 2016

(87) PCT Pub. No.: WO2015/107887
PCT Pub. Date: Jul. 23, 2015

(65) Prior Publication Data
US 2016/0330466 A1    Nov. 10, 2016

(30) Foreign Application Priority Data

Jan. 15, 2014 (JP) .................. 2014-004777

(51) Int. Cl.
*H04N 19/51* (2014.01)
*H04N 19/56* (2014.01)
(Continued)

(52) U.S. Cl.
CPC ........... *H04N 19/436* (2014.11); *H04N 19/56* (2014.11); *H04N 19/567* (2014.11)

(58) Field of Classification Search
None
See application file for complete search history.

(56) References Cited

U.S. PATENT DOCUMENTS 5,557,341 A    9/1996 Weiss et al.
9,596,467 B2*  3/2017 Takano .................. H04N 19/61
(Continued)

FOREIGN PATENT DOCUMENTS

JP    H06-506578 A    7/1994
JP    2008-5545 A     1/2008
(Continued)

OTHER PUBLICATIONS

Y. Chen, E. Li, X. Zhou and S. Ge, "Implementation of H.264 encoder and decoder on personal computers," Journal of Visual Communication and Image Representation, vol. 17, Issue 2, Apr. 2006, pp. 509-532, 2006. English Abstract.

(Continued)

*Primary Examiner* — Alison Slater

(57) ABSTRACT

A motion vector searching apparatus includes: a memory that stores a set of instructions, and stores a first motion vector selected as a motion vector for each of blocks into which an input image is divided; and at least one processor configured to execute the set of instructions to: generate candidate vectors on a basis of a predetermined search area; calculate ratings of the generated candidate vectors on a basis of the first motion vector for each of adjacent blocks, the generated candidate vectors, the input image and the reference image, the adjacent blocks being the blocks that are included in the input image and located around an object block; and select as a second motion vector of the object block a candidate vector based on the ratings from among the candidate vectors.

9 Claims, 19 Drawing Sheets

(51) Int. Cl.
*H04N 19/567* (2014.01)
*H04N 19/436* (2014.01)

(56) References Cited

U.S. PATENT DOCUMENTS

| | | | | |
|---|---|---|---|---|
| 2009/0092188 A1* | 4/2009 | Lee | ............. | H04N 19/44 |
| | | | | 375/240.16 |
| 2011/0228840 A1* | 9/2011 | Yamori | ............. | H04N 19/513 |
| | | | | 375/240.03 |
| 2013/0077885 A1* | 3/2013 | Wang | ............. | G06K 9/36 |
| | | | | 382/238 |

FOREIGN PATENT DOCUMENTS

| | | |
|---|---|---|
| JP | 2008-053875 A | 3/2008 |
| JP | 2011-130265 A | 6/2011 |
| JP | 2013-118626 A | 6/2013 |
| WO | 2012/086829 A1 | 6/2012 |

OTHER PUBLICATIONS

International Search Report for PCT Application No. PCT/JP2015/000132, dated Apr. 7, 2015.
English translation of Written opinion for PCT Application No. PCT/JP2015/000132.
Communication dated Aug. 21, 2018 from the Japanese Patent Office in counterpart Application No. 2015-557767.
Fuimiyo Takano et al. "Relaxation of Inter-block Dependencies to Accelerate GPU H.264 Motion Estimation", Sep. 7, 2011, Forum on Information Technology 2011 in Hakodate, pp. 425-432.

* cited by examiner

Fig. 8

SEARCH STEP 1

SEARCH STEP 2

BLOCK INFLUENCED BY
CODING OBJECT BLOCK

Fig. 13
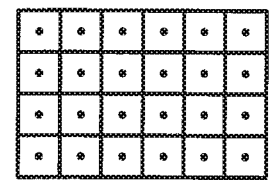
SEARCH STEP 1
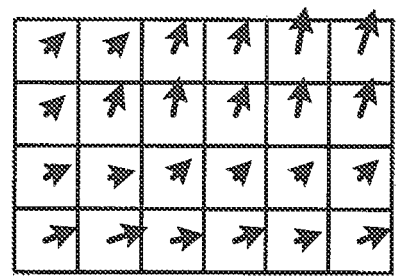
SEARCH STEP 2
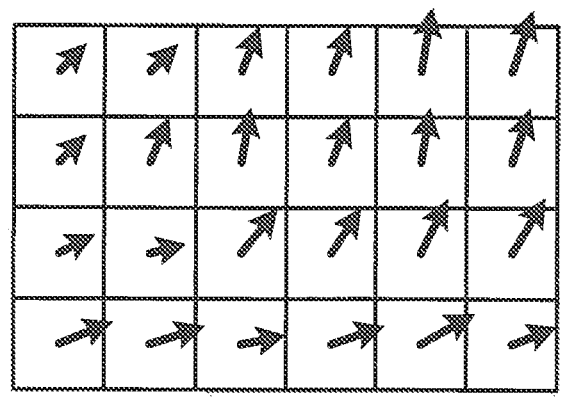

MOTION VECTOR SEARCHING APPARATUS, MOTION VECTOR SEARCHING METHOD, AND STORAGE MEDIUM STORING MOTION VECTOR SEARCHING PROGRAM

This application is a National Stage Entry of PCT/JP2015/000132 filed on Jan. 14, 2015, which claims priority from Japanese Patent Application 2014-004777 filed on Jan. 15, 2014, the contents of all of which are incorporated herein by reference, in their entirety.

TECHNICAL FIELD

The present invention relates to a video encoding technology and, in particular, to a technology for detecting motion vectors.

BACKGROUND ART

Video compression encoding technologies are widely used today. Video compression encoding technologies are used in a wide variety of applications such as digital broadcasting, distribution of video contents on optical discs, and video delivery over the Internet or the like. Further, video compression encoding technologies have progressed to the point where video signals can be encoded with low bit rates and high compression rates as well as high image quality. Examples of technologies for encoding video signals to generate encoded data and decoding encoded video include: H.261 and H.263 standardized by ITU (International Telecommunication Union), MPEG (Motion Picture Experts Group)-1, MPEG-2, and MPEG-4 developed by ISO (International Organization for Standardization), and VC-1 developed by SMPTE (Society of Motion Picture and Television Engineers). These technologies are widely used as international standards. H.264/MPEG-4 AVC (Advanced Video Coding) jointly standardized by ITU and ISO is also becoming widespread. Hereinafter, H.264/MPEG-4 AVC will be referred to as H.264. Further, a new video compression coding standard, H.265/MPEG-H HEVC (High Efficiency Video Coding) was standardized in 2013. Hereinafter, H.265/MPEG-H HEVC will be referred to as H.265. It is reported that H.265 can compress a video to about 50% of the original data size with video quality equivalent to that of H.264. H.265 is expected to find use in a wide area of fields.

These video coding technologies are implemented by a combination of multiple elemental technologies such as motion compensated prediction, orthogonal transform of prediction error images, quantization of orthogonal transform coefficients, and entropy coding of quantized orthogonal transform coefficients. These video coding technologies are called hybrid coding.

In the motion compensated prediction mentioned above, a motion vector which represents motion of images between the previous frame and the current frame in a video is searched for each MB (Macro Block). In the following description of the present invention, a process for searching for motion vectors will be referred to as a "motion vector search process".

In a motion vector search process, processing such as predicted image generation, rate distortion cost calculation, comparison, and selection for each of many candidate vectors is repeated on each MB of an encoding object image. Accordingly, the motion vector search process requires a large amount of computation. The amount of computation required for the motion vector search process can occupy most of computation amount in the whole video encoding processing. It is therefore important to speed up the motion vector search process in order to speed up video encoding.

The trends in the design of processors that perform processing are toward multi-core and many-core processors. CPUs (Central Processing Units) of typical personal computers often include dual-core or quad-core processor cores. Some high-end CPUs include eight or more cores. Many-core accelerators in which 50 or more cores of processor cores are integrated have been commercialized. Further, GPUs (Graphics Processing Units) used for three-dimensional graphics processing are large-scale parallel processors including several thousands of processor cores. There is a technology called GPGPU (General Purpose Computing on Graphics Processing Unit) which uses such GPUs in other applications as well. If processing matches the properties of GPU, a GPU can be used to perform the processing several times or several tens of times faster than the processing performed using a CPU.

If the vector search process described above can be parallelized using such a multi-core or many-core processor, the motion vector search process can be significantly sped up. Speeding up the motion vector search process can speed up video encoding.

Section 4.3.1 of NPL 1 discloses a technology for performing motion vector search processes in parallel. In a motion vector search process, already encoded vectors of adjacent blocks are used. In other words, there are dependencies among adjacent blocks. Accordingly, arbitrary blocks cannot be processed in parallel. In the technology disclosed in NPL 1, processing is parallelized among a plurality of MBs that are apart from one another in a frame and are in a given relative positional relationship with one another, as illustrated in FIG. 14 in NPL 1. The parallel processing is started at the MB at the upper left corner of the frame and proceeds toward the lower right corner while changing combinations of a plurality of MBs in the given relative positional relationship. This process is called wavefront processing.

Because processing such as predicted image generation, rate distortion cost calculation, comparison and selection for each of many candidate vectors is repeated on each MB of an encoding object image, the amount of computation required for the motion vector search process is large and may occupy most of computation amount for the whole video encoding processing. It is therefore important to speed up the motion vector search process in order to speed up video encoding.

CITATION LIST

Non Patent Literature

NPL 1
Y. Chen, E. Li, X. Zhou and S. Ge, "Implementation of H.264 encoder and decoder on personal computers," Journal of Visual Communication and Image Representation, Volume 17, Issue 2, April 2006, pp. 509-532, 2006.

SUMMARY OF INVENTION

Technical Problem

In the technology disclosed in NPL 1, only MBs in a given positional relationship as illustrated in FIG. 14 in NPL 1, for example, can be processed in parallel in a motion vector search process. If the size of an encoding object image is a full high definition (i.e. 1920 pixels×1080 pixels) size and the size of an MB is 16 pixels×16 pixels, the number of MBs that can be processed in parallel by the technology disclosed in NPL 1 is about 60 at a maximum. The degree of parallelism in this case is insufficient to perform parallel processing using a many-core accelerator with 50 or more cores or a many-core GPU with more than a several thousand cores. In other words, the technology disclosed in NPL 1 cannot achieve speedup of the motion vector search process in proportion to the number of cores of a many-core processor.

In the technology disclosed in NPL 1, parallelism is restricted by dependencies among adjacent blocks because vectors of the adjacent blocks are referred to when motion vectors are searched for. Therefore, the degree of parallelism can be improved by prohibiting reference to vectors, for example. However, if reference to vectors is prohibited, the accuracy of motion vectors decreases, which decreases the compression rate and degrades image quality.

One object of the present invention is to provide a motion vector searching apparatus that is capable of improving the degree of parallelism of parallel processing in motion vector searching without decreasing the accuracy of motion vectors.

Solution to Problem

A motion vector searching apparatus according to a mode of the present invention includes: control means for generating candidate vectors on a basis of a predetermined search area; motion vector memory means for storing, for each of blocks in which an input image is divided, a first motion vector selected as a motion vector that is a vector from a position of a region of a reference image to a position of a block, the region being related with the block; cost calculating means for calculating evaluation values each indicating ratings of the generated candidate vectors on a basis of the first motion vector for each of adjacent blocks, the generated candidate vectors, the input image and the reference image, the adjacent blocks being the blocks that are included in the input image and located around an object block; and vector selecting means for selecting as a second motion vector of the object block a candidate vector having a high rating in evaluation by the evaluation values from among the candidate vectors.

A motion vector searching method according to a mode of the present invention includes: generating candidate vectors on a basis of a predetermined search area; storing, for each of blocks in which an input image is divided, a first motion vector selected as a motion vector that is a vector from a position of a region of a reference image to a position of a block into motion vector storage means, the region being related with the block; calculating evaluation values each indicating ratings of the generated candidate vectors on a basis of the first motion vector for each of adjacent blocks, the generated candidate vectors, the input image and the reference image, the adjacent blocks being the blocks that are included in the input image and located around an object block; and selecting as a second motion vector of the object block a candidate vector having a high rating in evaluation by the evaluation values from among the candidate vectors.

A computer-readable storage medium according to a mode of the present invention stores a motion vector searching program causing a computer to operate as: control means for generating candidate vectors on a basis of a predetermined search area; motion vector memory means for storing, for each of blocks into which an input image is divided, a first motion vector selected as a motion vector, the motion vector being a vector from a position of a region of a reference image to a position of a block, the region being related with the block; cost calculating means for calculating evaluation values each indicating ratings of the generated candidate vectors on a basis of the first motion vector for each of adjacent blocks, the generated candidate vector, the input image and the reference image, the adjacent blocks being the blocks that are included in the input image and located around an object block; and vector selecting means for selecting as a second motion vector of the object block a candidate vector having a high rating in evaluation by the evaluation values from among the candidate vectors.

The present invention can be also implemented by a motion vector searching program stored on such a computer-readable storage medium.

Advantageous Effects of Invention

The present invention has the advantageous effect of improving the degree of parallelism of parallel processing in motion vector searching without decreasing the accuracy of motion vectors.

BRIEF DESCRIPTION OF DRAWINGS

FIG. 8 is a diagram schematically illustrating an operation for searching for motion vectors according to the first exemplary embodiment of the present invention.

FIG. 13 is a diagram schematically illustrating transformed input images and transformed motion vectors used in a search process in the fourth exemplary embodiment.

DESCRIPTION OF EMBODIMENTS

Exemplary embodiments of the present invention will be described below in detail with reference to the drawings.

First, an H.264-based video encoder will be described with reference to a drawing as an example of configuration of a video encoder for comparison with exemplary embodiments of the present invention. In H.264, intra prediction and deblocking filter technologies are used in order to improve compression efficiency and image quality. Intra prediction is a technology that uses information about adjacent pixels in the same image frame to perform prediction. The deblocking filter technology is a technology for reducing coding noise that has occurred in encoded images. H.264 is detailed in Literature 1 given below, for example.

(Literature 1) ITU-T Recommendation H.264 "Advanced video coding for generic audiovisual services", March 2010.

Figure 1:
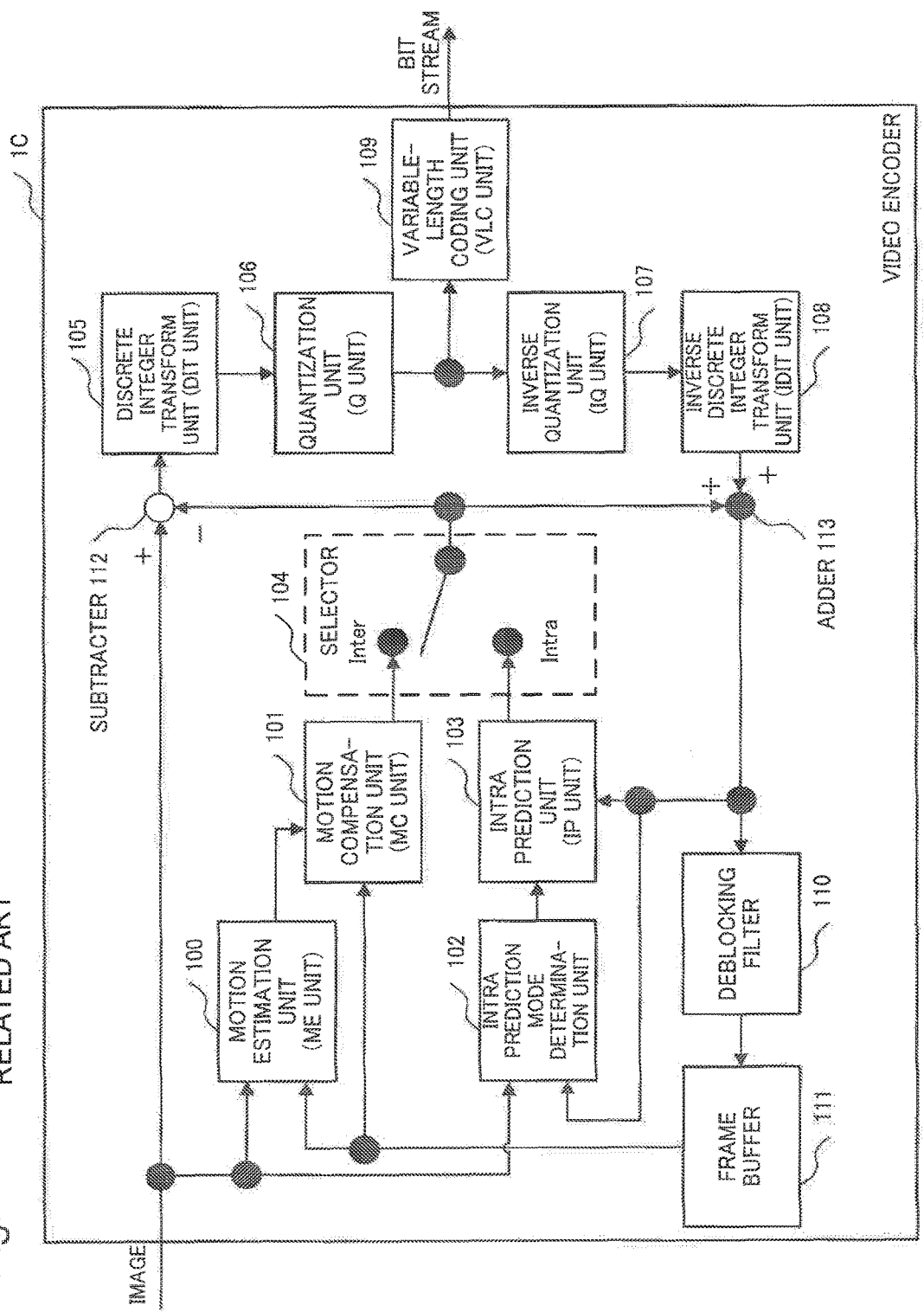
FIG. 1 is a block diagram illustrating an exemplary configuration of an H.264-based video encoder 1C.

FIG. 1 is a block diagram illustrating an exemplary configuration of an H.264-based video encoder 1C. The H.264-based video encoder 1C illustrated in FIG. 1 will be also referred to as the comparative example video encoder 1C in the following description. Referring to FIG. 1, the video encoder 1C includes the following components.

A motion estimation unit 100,
A motion compensation unit 101,
An intra prediction mode determination unit 102,
An intra prediction unit 103,
A selector 104,
A discrete integer transform unit 105,
A quantize unit 106,
An inverse quantization unit 107,
An inverse discrete integer transform unit 108,
A variable-length coding unit 109,
A deblocking filter 110,
A frame buffer 111,
A subtracter 112, and
An adder 113.

The frame buffer 111 stores image data in a frame already encoded in the past.

When a new image is input into the video encoder 1C, an encoding process is performed on the input image in units of a 16×16-pixel block called a macro block (MB).

The motion estimation (ME) unit 100 detects a displacement of an image block between the input image and the encoded image stored in the frame buffer 111. The motion estimation unit 100 outputs a motion vector equivalent to the detected displacement. The input image is a frame, for example, included in a video to be encoded by the video encoder 1C. An input image will be also referred to as an encoding object image in the following description.

The motion compensation (MC) unit 101 uses the encoded image stored in the frame buffer 111 and motion vectors provided from the motion estimation unit 100 to perform a motion compensation process. The motion compensation unit 101 then outputs a motion-compensated predicted image obtained as a result of the motion compensation process.

The intra prediction mode determination unit 102 uses the input image and already encoded macro block images in the same image to select an appropriate intra prediction mode (i.e. typically an intra prediction mode that provides the highest coding efficiency). The intra prediction mode determination unit 102 typically selects an intra prediction mode that provides the highest coding efficiency as the appropriate intra prediction mode. The intra prediction mode determination unit 102 outputs the selected intra prediction mode.

The intra prediction (IP) unit 103 uses encoded macro block images in the same image and the intra prediction mode provided from the intra prediction mode determination unit 102 to perform an intra prediction process. The intra prediction is also referred to as intra-frame prediction.

The intra prediction unit 103 outputs an intra-predicted image obtains as a result of the intra prediction process.

The selector 104 selects an appropriate image out of the motion-compensated predicted image provided from the motion compensation unit 101 and the intra-predicted image provided from the intra prediction unit 103 as a predicted image. The selector 104 typically selects an image that provides a higher coding efficiency as the appropriate image. The selector 104 outputs the selected image as a predicted image. The mode in which a motion-compensated predicted image is selected is sometimes called the inter mode and the mode in which an intra-predicted image is selected is sometimes called the intra mode.

The subtracter 112 subtracts the predicted image output from the selector 104 from the input image to derive a prediction error image. The subtracter 112 outputs the derived prediction error image.

The discrete integer transform (DIT) unit 105 performs an orthogonal transform process similar to DCT (discrete cosine transform) on the output prediction error image. The discrete integer transform unit 105 outputs an orthogonal transform coefficient sequence obtained as a result of the orthogonal transform process.

The quantization (Q: quantize) unit 106 performs a quantization process on the output orthogonal transform coefficient sequence. The quantize unit 106 then output the quantized orthogonal transform coefficient sequence.

The variable-length coding (VLC) unit 109 encodes the quantized orthogonal transform coefficient sequence in accordance with a predetermined rule. The variable-length coding unit 109 outputs the result of the encoding as a bit stream. This is a bit stream output from the H.264-based video encoder 1C.

The inverse quantization (IQ) unit 107 performs an inverse quantization process on the quantized orthogonal transform coefficient sequence.

The inverse discrete integer transform (IDIT) unit 108 performs an inverse integer transform process on the result of the inverse quantized process.

The adder 113 adds the predicted image output from the selector 104 and the result of the inverse integer transform process together.

Further, the deblocking filter 110 performs a deblocking filtering process on the image obtained by the addition to generate a local decoded image.

The local decoded image is stored in the frame buffer 111. The local decoded image stored in the frame buffer 111 is used in encoding of a subsequent frame. For example, a reference image, which will be described later, is the local decoded image. Further details of the process described above are disclosed in Literature 2 given below, for example.

(Literature 2) Joint Video Team (JVT) of ISO/IEC MPEG and ITU-T VCEG, Document JVT-O079, "Text Description of Joint Mode Reference Encoding Method and Decoding Concealment Method", April, 2005.

The motion estimation unit 100 included in the video encoder 1C will be described below in detail with reference to drawings.

Figure 2:
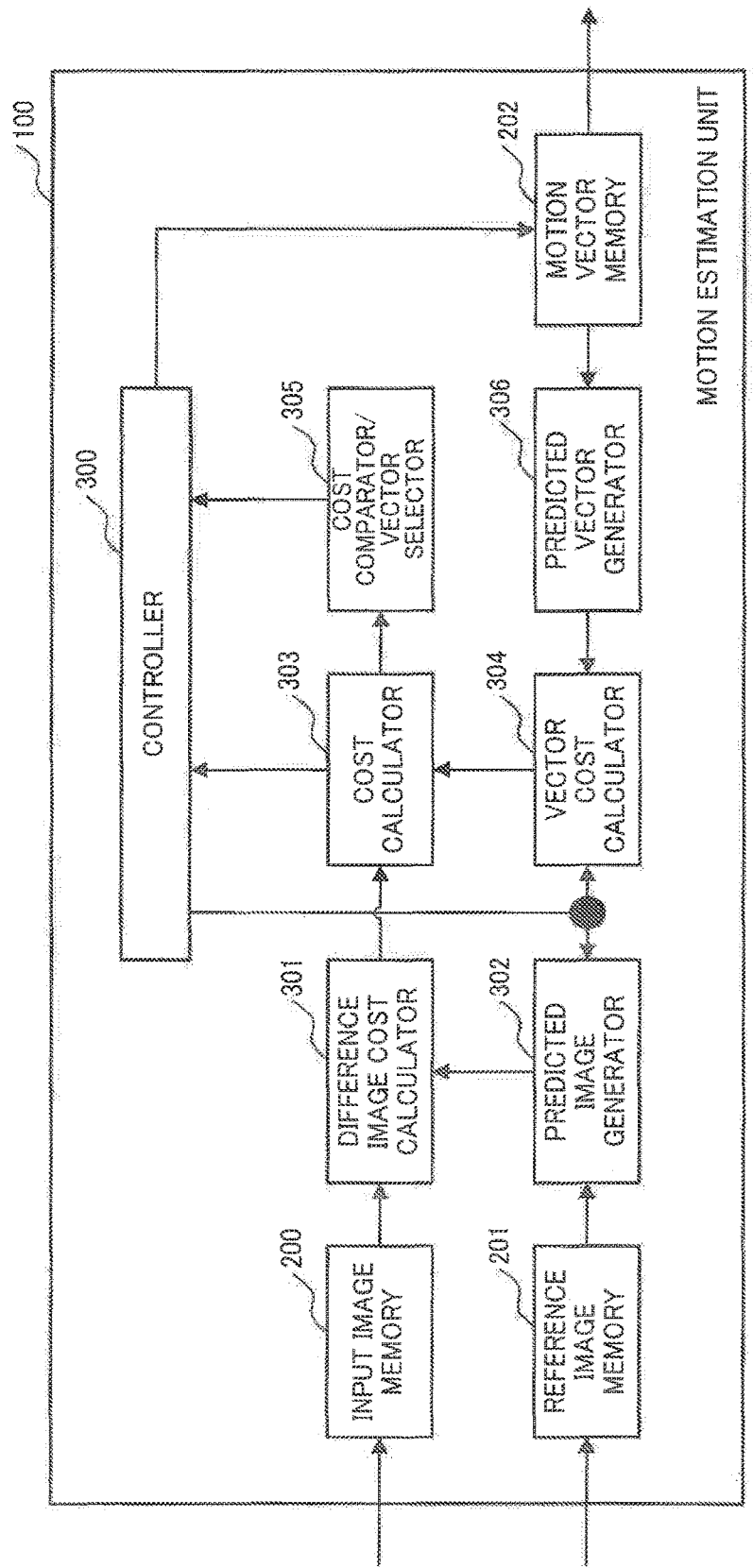
FIG. 2 is a block diagram illustrating an exemplary configuration of a motion estimation unit 100 of the H.264-based video encoder 1C.

FIG. 2 is a diagram illustrating an exemplary configuration of the motion estimation unit 100 of the H.264-based video encoder 1C. Referring to FIG. 2, the motion estimation unit 100 includes the following components.

An input image memory 200,
A reference image memory 201,
A motion vector memory 202,
A controller 300,
A difference image cost calculator 301,
A predicted image generator 302,
A cost calculator 303,
A vector cost calculator 304,
A cost comparator/vector selector 305, and
A predicted vector generator 306.

The cost comparator/vector selector 305 is also referred to as vector selector 305.

The input image memory 200 stores an input image.

The reference image memory 201 stores image data already encoded in the past. The image data encoded in the past and stored in the reference image memory 201 is referred to during motion compensated prediction. The image stored in the reference image memory 201 is the local decoded image described above. The image stored in the reference image memory 201 is also referred to as a reference image. The frame buffer 111 illustrated in FIG. 1 may act as the reference image memory 201. In that case, the reference image memory 201 may be omitted from the motion estimation unit 100.

The motion vector memory 202 stores a motion vector derived from an encoded MB in an encoding object image.

The motion estimation unit 100 is responsible for obtaining an optimal motion vector to be used for motion compensated prediction. The accuracy of motion vectors obtained by the motion estimation unit 100 has a decisive influence on the performance of compression. In this process, it is essential to obtain motion vectors that reduce noise in a decoded image while minimizing the amount of information to be encoded. For this reason, an approach called RD (Rate-Distortion) optimization is widely used in recent video encoders. In RD optimization, rate distortion cost that can be written as Equation 1 is calculated for many candidate motion vectors. A candidate motion vector that minimizes the rate distortion cost is employed as the optimal motion vector.

$$J = D + \lambda R \quad \text{(Equation 1)}$$

Here D is the amount of distortion (difference image cost) that occurs in a predicted difference image, R is the amount of code (vector cost) generated by coding of a motion vector, λ is a weighting factor (cost factor) that depends on the complexity of the image or the like. RD optimization is detailed in Literature 2 given above and Literature 3 given below, for example.

(Literature 3) G. J. Sullivan, T. Wiegand, "Rate-distortion optimization for video compression", Signal Processing Magazine, IEEE, vol. 15, no. 6, pp. 74-90, 1998.

The motion estimation unit 100 obtains motion vectors using RD optimization.

The controller 300 controls the operation of the motion estimation unit 100. The controller 300 generates candidate vectors on the basis of a given search area and provides the generated candidate vectors to the predicted image generator 302 and the vector cost calculator 304.

The difference image cost calculator 301 calculates a difference image between a predicted image provided from the predicted image generator 302 and an encoding object image which is provided from the input image memory 200.

The predicted image generator 302 generates a predicted image by performing a motion compensation process using a reference image stored in the reference image memory 201 on the basis of candidate vectors provided from the controller 300.

The difference image cost calculator 301 calculates a difference image between a predicted image provided from the predicted image generator 302 and an encoding object image which is provided from the input image memory 200. As described above, an input image is the encoding object image.

The predicted vector generator 306 generates a predicted vector for an encoding object MB by using motion vectors of encoded MBs retrieved from the motion vector memory 202.

The vector cost calculator 304 calculates the vector cost of a candidate vector provided from the controller 300 on the basis of the candidate vector and a predicted vector provided from the predicted vector generator 306.

The cost calculator 303 calculates the rate distortion cost expressed by Equation 1 on the basis of a difference image cost, a vector cost and a cost coefficient (λ in Equation 1) which is provided from the controller 300. The rate distortion cost is an evaluation value which is an indicator of the degree of optimality of a provided candidate vector as a motion vector for an encoding object block.

The cost comparator/vector selector 305 selects the current candidate vector as a tentative optimal vector when the rate distortion cost provided from the cost calculator 303 is smaller than the rate distortion cost of a candidate vector that has been already evaluated. In other words, the cost comparator/vector selector 305 selects a candidate vector that has the smallest rate distortion cost for each block of the input image as a tentative optimal vector.

An operation of the motion estimation unit 100 will be described next in detail with reference to drawings.

Figure 3:
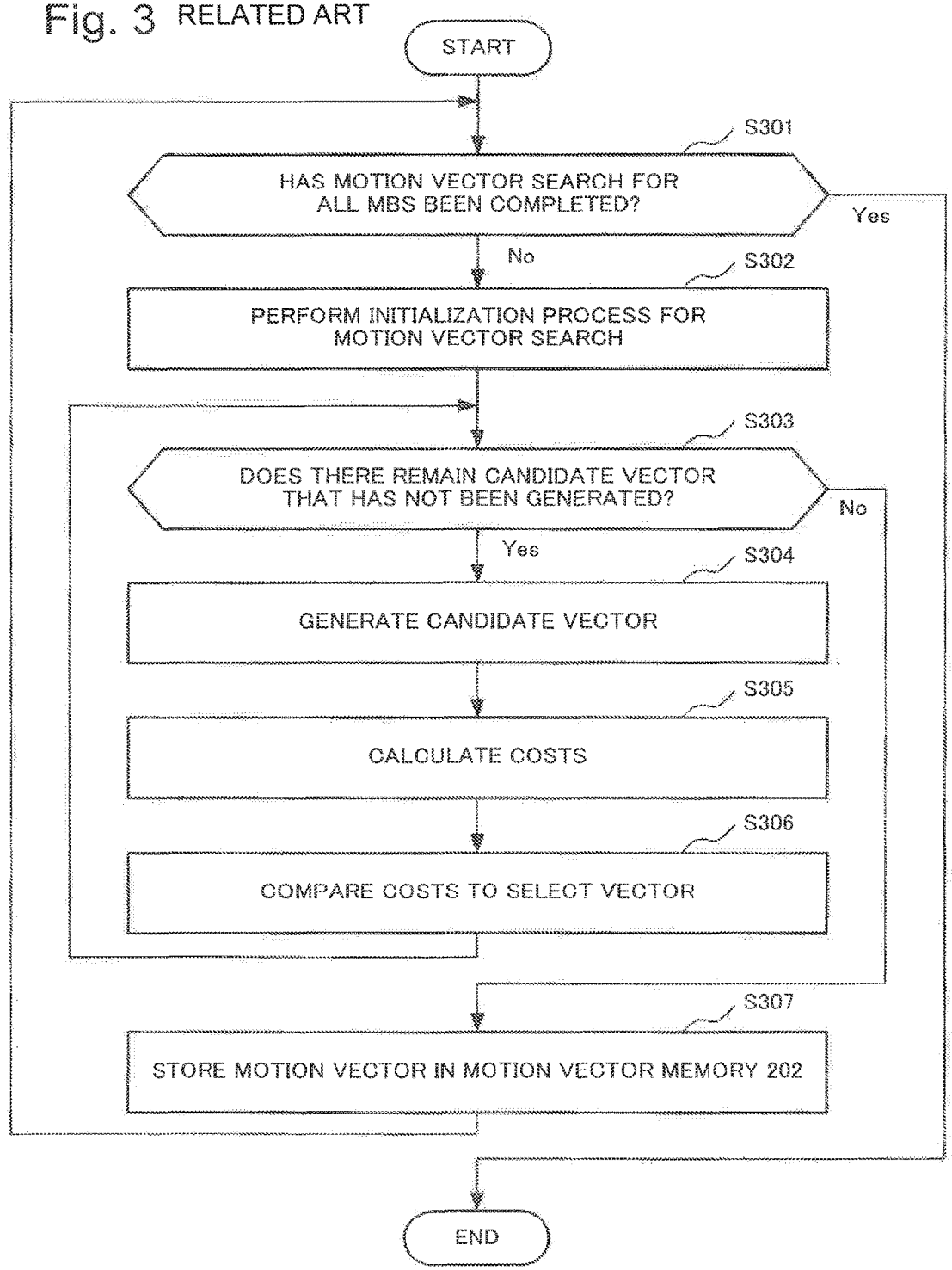
FIG. 3 is a flowchart illustrating an example of operation of the motion estimation unit 100 of the H.264-based video encoder 1C.

FIG. 3 is a flowchart illustrating an operation of the motion estimation unit 100 of the H.264-based video encoder 1C.

The controller 300 determines whether there is an unprocessed MB in an encoding object image (step S301). If there is not an unprocessed MB (Yes at step S301), the motion estimation unit 100 ends the operation illustrated in FIG. 3. If there is an unprocessed MB (No at step S301), the controller 300 performs an initialization process for motion vector search on the MB as an encoding object block (step S302). In the initialization process, the controller 300 initializes a tentative optimum motion vector, which will be described later, and a value to be held as the minimum value of rate distortion cost, and sets initial search candidate vectors.

The controller 300 then determines whether there remains a candidate vector that has not been generated for the encoding object block (step S303). When a candidate vector that has not be generated remains (Yes at step S303), the controller 300 generates a candidate vector to be searched (step S304). The controller 300 may raster-scan a given search area to generate candidate vectors in sequence. For example, the controller 300 may generate a vector representing a selected position in a search area as a candidate vector while sequentially selecting positions in the search area. The controller 300 may set next candidate vectors around a tentative optimal vector at a point of time. The controller 300 may use any of various other methods to generate candidate vectors. When candidate vectors have been generated for the entire search area, the controller 300 may determine that a candidate vector that has not been generated does not remain. The controller 300 provides the generated candidate vectors to the predicted image generator 302.

Then the cost calculator 303 calculates the rate distortion cost expressed by Equation 1 (step S305).

To that end, first the predicted image generator 302 generates a predicted image by performing a motion compensation process using a reference image stored in the reference image memory 201 on the basis of a candidate vector provided from the controller 300. The predicted image generator 302 provides the generated predicted image to the difference image cost calculator 301.

The difference image cost calculator 301 calculates a difference image between the predicted image provided from the predicted image generator 302 and an encoding object image which is provided from the input image memory 200. The difference image cost calculator 301 further calculates a difference image cost based on the amount of distortion of the difference image. The difference image cost calculated by the difference image cost calculator 301 may be the sum of absolute differences (SAD) between pixel values. The difference image cost calculated by the difference image cost calculator 301 may be the sum of square differences (SSD) between pixel values. The difference image cost calculated by the difference image cost calculator 301 may be the sum of absolute transformed differences (SATD) of coefficients obtained by applying a given transform to differences between pixel values.

The predicted vector generator 306 retrieves a motion vector of an encoded MB from the motion vector memory 202. The predicted vector generator 306 generates a predicted vector for the encoding object MB by using the retrieved motion vector of the encoded MB. A procedure for calculating a predicted vector is specified in a coding standard.

Figure 4:
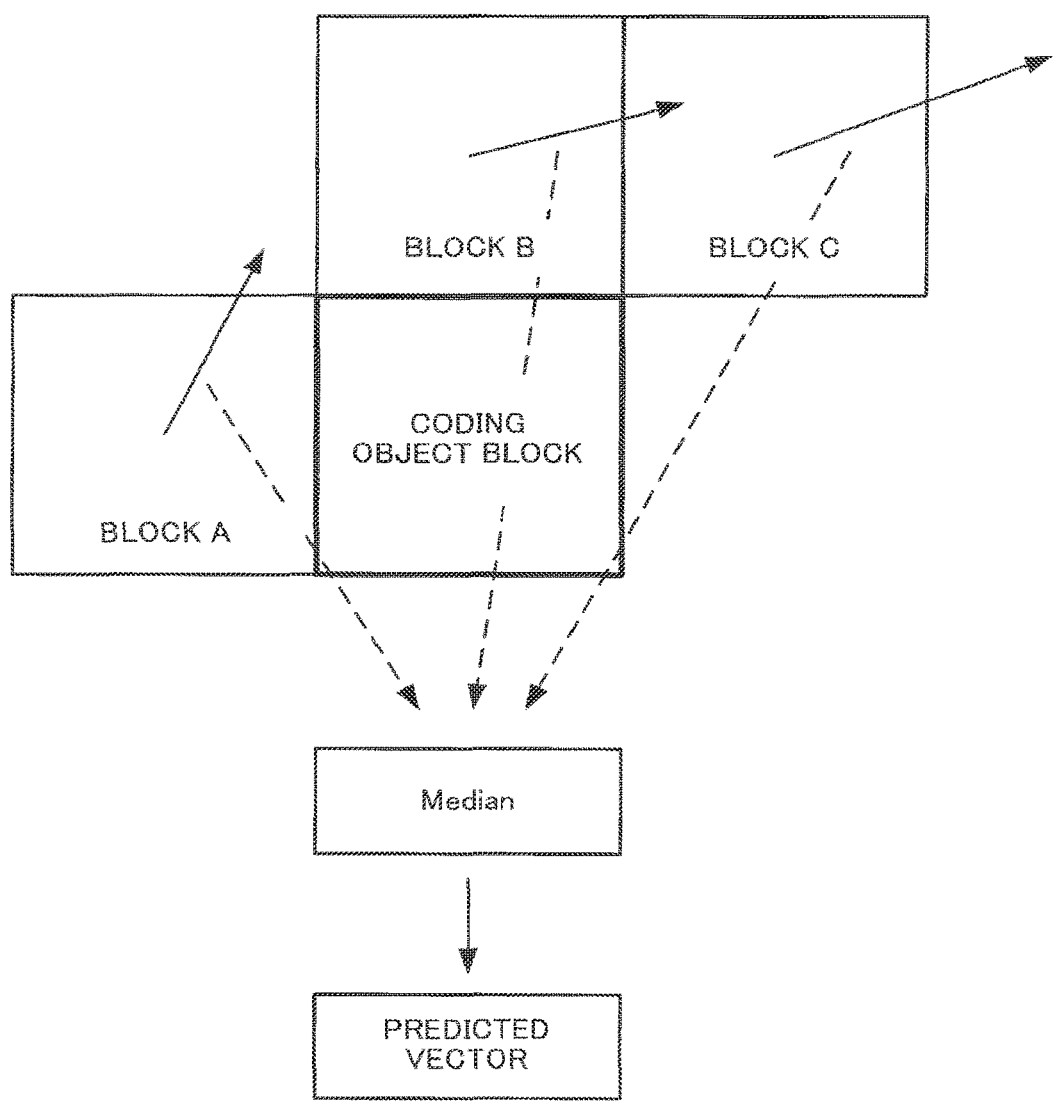
FIG. 4 is a diagram schematically illustrating motion vectors used for calculation of a predicted vector in H.264.

FIG. 4 is a diagram schematically illustrating motion vectors used for calculating a predicted vector in H.264. For example, in H.264, motion vectors of adjacent blocks that are located to the left (Block A), above (Block B), and upper right (Block C) of the encoding object block as illustrated in FIG. 4 are used for calculating a predicted vector. The predicted vector generator 306 obtains the median of the three motion vectors as a predicted vector.

Figure 5:
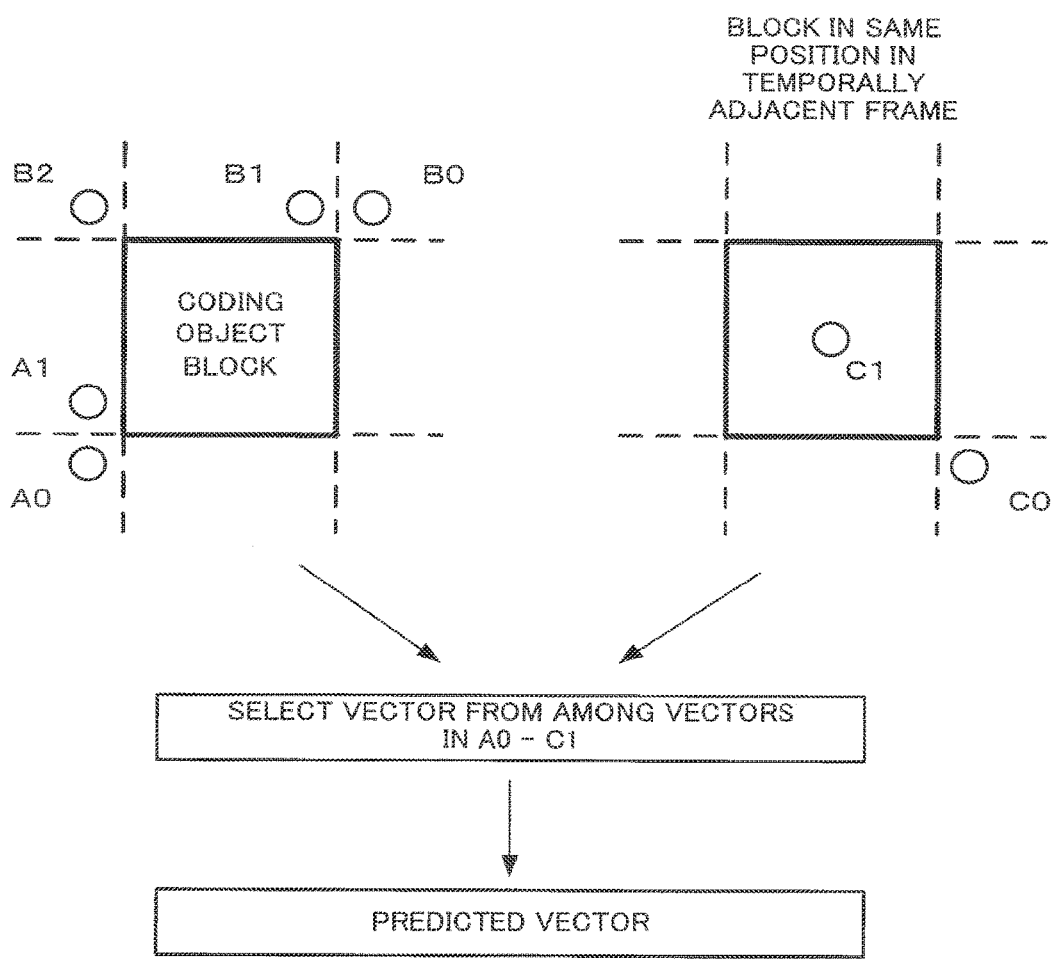
FIG. 5 is a diagram schematically illustrating motion vectors used for calculation of a predicted vector in H.265.

FIG. 5 is a diagram schematically illustrating motion vectors used for calculating a predicted vector in H.265. In H.265, the predicted vector generator 306 lists motion vectors for five positions spatially adjacent to an encoding object block and motion vectors for two positions neighboring a block in the same position in a temporally adjacent frame in accordance with a predetermined rule. The temporally adjacent frame may be the frame that temporally precedes the encoding object frame, for example. The five positions spatially adjacent to the encoding object block are positions A0 to B2 in FIG. 5. The two positions C0 and C1 neighboring the block in the same position in the temporally adjacent frame are two positions C0 and C1 in FIG. 5. The predicted vector generator 306 selects one of the vectors in the list as a predicted vector. H.265 is detailed in Literature 4 given below, for example.

(Literature 4) ITU-T Recommendation H.265 "Advanced video coding for generic audiovisual services", April, 2013.

The vector cost calculator 304 calculates the vector cost of a candidate vector provided from the controller 300 on the basis of the candidate vector and the predicted vector provided from the predicted vector generator 306. The vector cost of the candidate vector is the amount of code generated for encoding the candidate vector.

The cost calculator 303 calculates the rate distortion cost expressed by Equation 1 on the basis of the difference image cost, the vector cost, and the cost coefficient ($\lambda$ in Equation 1) which is provided from the controller 300 (step S305). The difference image cost is provided from the difference image cost calculator 301. The vector cost is provided from the vector cost calculator 304. The controller 300 provides the cost coefficient to the cost calculator 303.

Then, the cost comparator/vector selector 305 compares the rate distortion cost provided from the cost calculator 303 and the minimum value of the rate distortion costs of candidate vectors that have already been evaluated. If the cost of the current candidate vector is smaller, the cost comparator/vector selector 305 selects the current candidate vector as a tentative optimal vector and updates the minimum value of rate distortion costs. The cost comparator/vector selector 305 provides the tentative optimal vector to the controller 300 (step S306).

The controller 300 decides a candidate vector to be evaluated next by using the tentative optimal vector, etc. When evaluation of all candidate vectors has been completed, the controller 300 ends the motion vector search for the current block. The controller 300 determines a tentative optimal vector at the point of time at the completion of the motion vector search as the ultimate motion vector. The controller 300 stores the determined ultimate motion vector into the motion vector memory 202 (step S307).

When the motion vector search process described above has been performed for the MBs in the image in the raster scan order, the motion vector search process for one frame is completed.

<First Exemplary Embodiment>

A first exemplary embodiment of the present invention will be described next in detail with reference to drawings.

Figure 14:
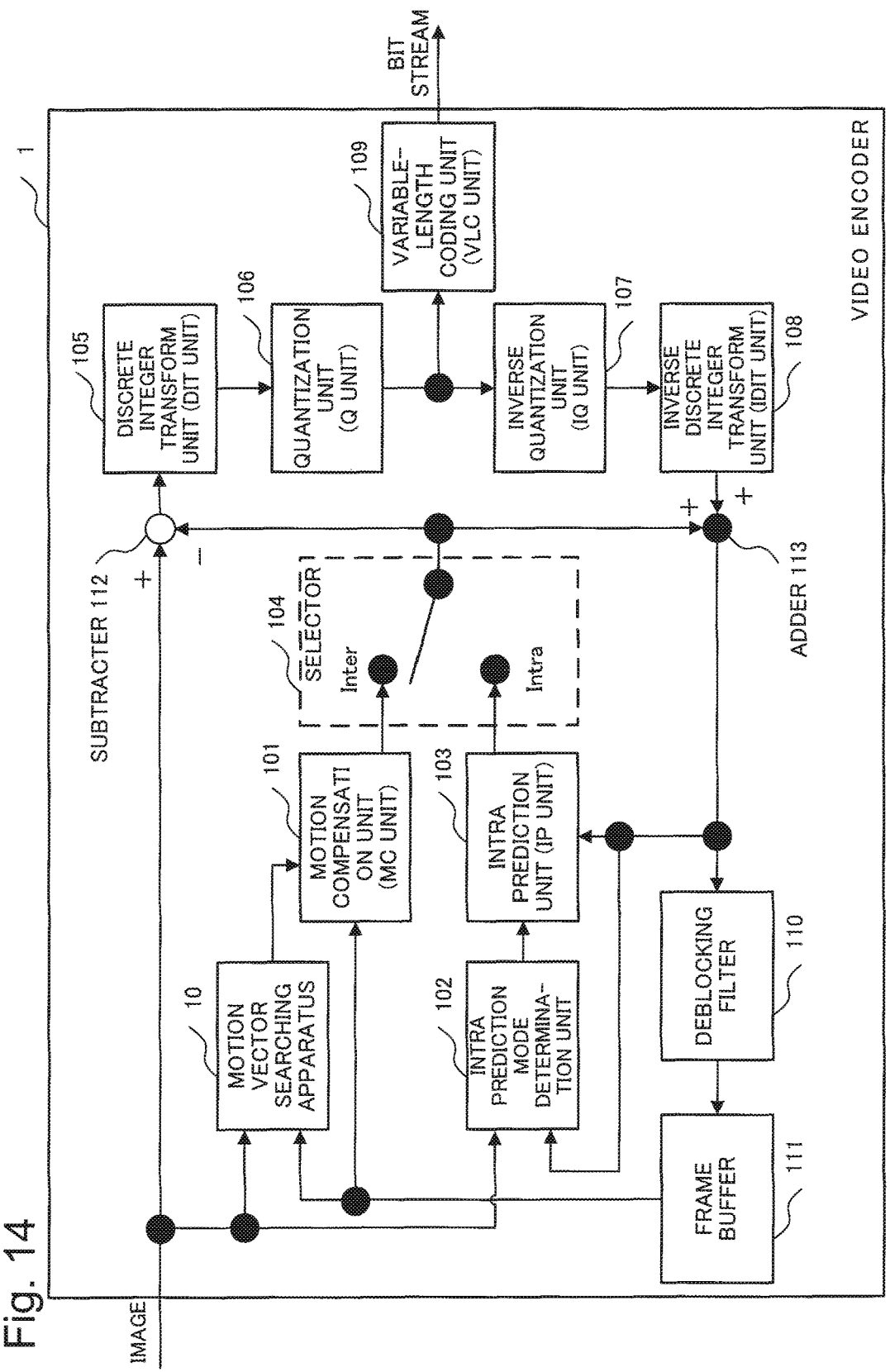
FIG. 14 is a block diagram illustrating an exemplary configuration of a video encoder 1 according to the first and second exemplary embodiments.

FIG. 14 is a block diagram illustrating an exemplary configuration of a video encoder 1 according to the present exemplary embodiment.

Comparing FIG. 14 with FIG. 1, the video encoder 1 according to the present exemplary embodiment includes a motion vector searching apparatus 10 in place of the motion estimation unit 100. The other components of the video encoder 1 are the same as the components of the video encoder 1C that are labeled with the same reference numerals. Like the video encoder 1C, the video encoder 1 outputs a bit stream of H.264, for example, when a video is input.

Motion vector searching in the video encoder 1 in which the motion vector searching apparatus 10 encodes a video in accordance with H.264 will be described below in exemplary embodiments of the present invention. However, video encoders to which the motion vector searching apparatus 10 according to the present exemplary embodiment and motion vector searching apparatuses according to other exemplary embodiments can be applied are not limited to video encoders that encode videos in accordance with H.264 or H.265. The motion vector searching apparatus 10 according to the present exemplary embodiment and motion vector searching apparatuses according to other exemplary embodiments are also applicable to video encoders that encode videos using other international-standard coding methods or non-international-standard coding methods.

Figure 6:
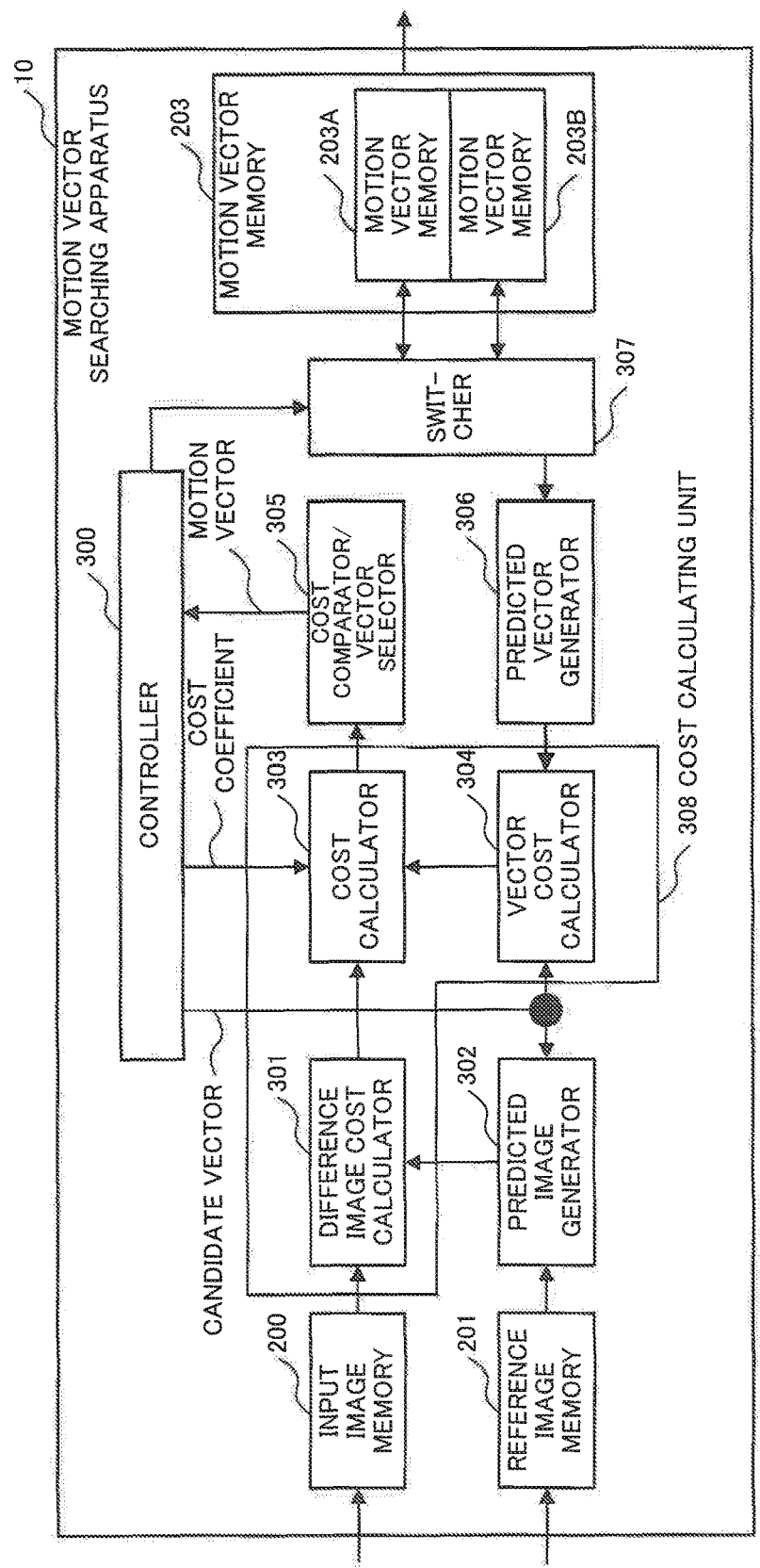
FIG. 6 is a block diagram illustrating an exemplary configuration of a motion vector searching apparatus 10 according to first and second exemplary embodiments of the present invention.

FIG. 6 is a block diagram illustrating an exemplary configuration of the motion vector searching apparatus 10 according to the present exemplary embodiment.

Referring to FIG. 6, the motion vector searching apparatus 10 includes the following components.

An input image memory 200,
A reference image memory 201,
A motion vector memory 203,
A controller 300,
A predicted image generator 302,
A predicted vector generator 306,
A switcher 307, and
A cost calculating unit 308.

The cost calculating unit 308 includes a difference image cost calculator 301, a cost calculator 303, and a vector cost calculator 304.

Comparing the configuration of the motion vector searching apparatus 10 illustrated in FIG. 6 with the configuration of the motion estimation unit 100 illustrated in FIG. 2, the motion vector searching apparatus 10 according to the present exemplary embodiment includes a motion vector memory 203 in place of the motion vector memory 202. In addition, the motion vector searching apparatus 10 includes the switcher 307 and the cost calculating unit 308, which are not included in the motion estimation unit 100. The difference image cost calculator 301, the cost calculator 303 and the vector cost calculator 304 are included in the cost calculating unit 308. The other components of the motion vector searching apparatus 10 according to the present exemplary embodiment operate in a similar way to the components of the motion estimation unit 100 illustrated in FIG. 2 that are labeled with the same reference numerals, except for differences described below.

The motion vector memory 203 stores motion vectors. The motion vector memory 203 is divided into two: a first memory area and a second memory area. The first memory area is accessed as a motion vector memory 203A or a motion vector memory 203B. Similarly, the second memory area is accessed as the motion vector memory 203B or the motion vector memory 203A. In the following description, the motion vector memory 203A is also referred to as a memory A. Similarly, the motion vector memory 203B is also referred to as a memory B.

The switcher 307 switches the memory area to be accessed as the motion vector memory 203A between the first memory area and the second memory area in response to an instruction received from the controller 300, for example. Similarly, the switcher 307 switches the memory area to be accessed as the motion vector memory 203B between the second memory area and the first memory area in response to an instruction from the controller 300, for example. When the first memory area is accessed as the motion vector memory 203A, the switcher 307 makes switching so that the second memory area is accessed as the motion vector memory 203B. When the first memory area is accessed as the motion vector memory 203B, the switcher 307 makes switching so that the second memory area is accessed as the motion vector memory 203A.

In the present exemplary embodiment, motion vectors provided from the controller 300 are stored in the motion vector memory 203A. In other words, the controller 300 stores derived motion vectors in the motion vector memory 203A. On the other hand, motion vectors are provided from the motion vector memory 203B to the predicted vector generator 306. In other words, the predicted vector generator 306 retrieves motion vectors from the motion vector memory 203B.

An operation of the motion vector searching apparatus 10 according to the present exemplary embodiment will be described next in detail with reference to drawings.

Figure 7:
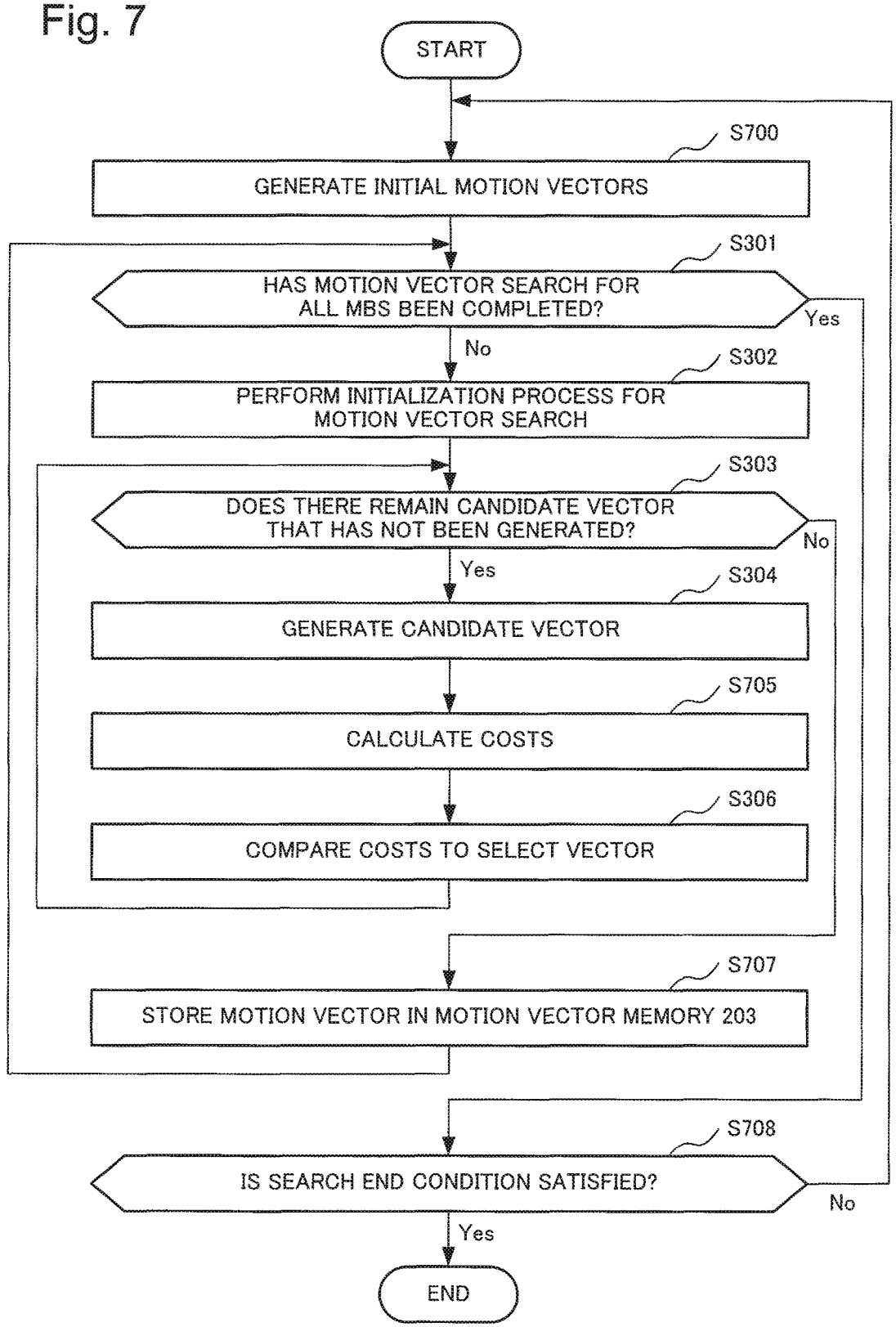
FIG. 7 is a flowchart illustrating an example of operation of the motion vector searching apparatus 10 according to the first, the second and third exemplary embodiments of the present invention.

FIG. 7 is a flowchart illustrating an example of operation of the motion vector searching apparatus 10 according to the present exemplary embodiment.

The operations at the steps illustrated in FIG. 7 are the same as the operations at the steps that are labeled with the same reference numerals in FIG. 3, except for the operations at steps S700, S705, S707 and S708.

As will be described later, the motion vector searching apparatus 10 according to the present exemplary embodiment performs motion vector search for an entire frame more than once. In other words, the motion vector searching apparatus 10 performs motion vector search more than once per entire encoding object image. In the following description, a single motion vector search in an entire frame will be referred to as a search step. In the first search step in an encoding object image, the motion vector searching apparatus 10 derives an optimum motion vector using predetermined motion vector initial values, instead of motion vectors of already encoded MBs of the encoding object image. In the second and subsequent search steps in the encoding object image, the motion vector searching apparatus 10 derives an optimum motion vector using motion vectors derived in the previous search step in the encoding object image.

Figure 8:
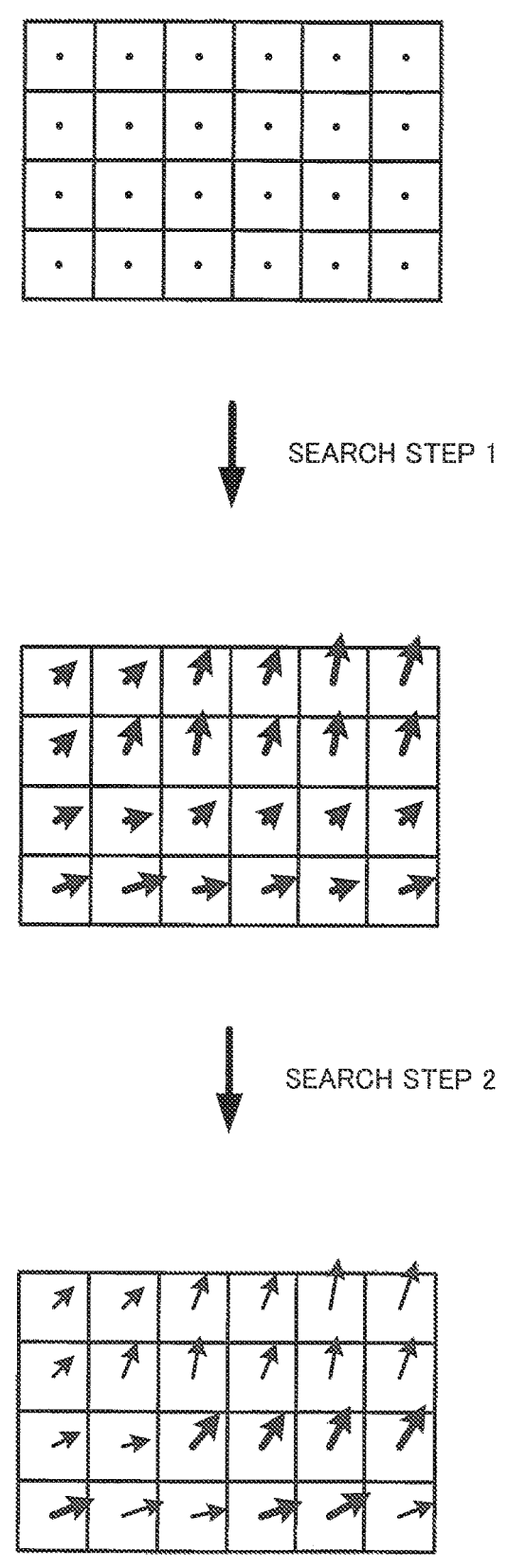

FIG. 8 is a diagram schematically illustrating examples of motion vectors updated in a plurality of search steps. Vectors illustrated in the top part of FIG. 8 represent initial values of motion vectors. Vectors illustrated in the middle part of FIG. 8 are motion vectors derived in the first search step (Search step 1). Predicted vector calculated in the first search step are zero vectors, for example. Vectors illustrated in the lower part of FIG. 8 are motion vectors derived in the second search step (Search step 2). In the second search step, the motion vectors derived in the first search step are used to calculate predicted vectors. The vectors represented by thick arrows among the vectors in the bottom part are motion vectors that have changed from motion vectors derived in the previous search step. In other words, the vectors represented by the thick arrows are motion vectors that are different from the motion vectors derived in the previous search step in the same block.

At step S700 in FIG. 7, the controller 300 performs an initialization process for performing motion vector search in an encoding object frame.

In the motion vector searching apparatus 10 according to the present exemplary embodiment, motion vectors in blocks adjacent to the block for which a motion vector is to be derived (i.e. an object block) that have been derived in the same search step are not used in calculation of a predicted vector in RD optimization. The motion vector searching apparatus 10 calculates a predicted vector in RD optimization by using motion vectors of the blocks adjacent to the object block that have been derived in the previous search step. For that purpose, in the initialization process at step S700, the controller 300 stores initial motion vectors for all of the blocks that are used in the first search step into the motion vector memory 203.

As described above, the controller 300 stores derived motion vectors in the motion vector memory 203A in the present exemplary embodiment. The predicted vector generator 306 retrieves motion vectors from the motion vector memory 203B.

In the first search step, the controller 300 stores the initial motion vectors in either the first memory area or the second memory area in the motion vector memory 203 at step S700. For example, when the controller 300 stores the initial motion vectors in the second memory area, the controller 300 may first send an instruction to the switcher 307 to make switching so that the second memory area is accessed as the motion vector memory 203A, i.e. the memory A. The controller 300 may then write the initial motion vectors into the memory A. In addition, the controller 300 may send an instruction to the switcher 307 to make switching so that the memory area in which the initial motion vectors are stored is accessed as the motion vector memory 203B, i.e. the memory B.

All of the initial motion vectors may be zero vectors, which indicate that there is no motion. In that case, the controller 300 stores vectors (0, 0), which are zero vectors, for all MBs into the memory A. In exemplary embodiments of the present invention, motion vectors, including initial motion vectors, are two-dimensional vectors. A two-dimensional zero vector is represented as a vector (0, 0). Alternatively, initial motion vectors may be motion vectors derived for an already encoded frame. In that case, the controller 300 stores motion vectors derived in MBs at the same position as that of the already encoded frame into the memory A. The controller 300 may store other initial motion vectors into the memory A. In other words, the controller 300 may initialize the memory A with other vectors.

After step S700, the controller 300 sends an instruction to the switcher 307 to allocate the memory area that has been allocated to the memory A during the initialization process to the memory B and to allocate the memory area that has been allocated to the memory B during the initialization process to the memory A. When the switcher 307 receives the instruction, the switcher 307 replaces the memory area allocated to the memory A and the memory area allocated to the memory B with each other. This allows the initial motion vectors to be retrieved from the memory B.

The operation from step S301 to S304 is the same as the operation at the steps in FIG. 3 performed by the motion estimation unit 100 that are labeled with the same reference numerals.

The cost calculation procedure at step S705 is the same as the cost calculation procedure at step S305 in FIG. 3. However, motion vectors provided to the predicted vector generator 306 at step S705 differ from the motion vectors provided to the predicted vector generator 306 at step S305. The motion vectors provided to the predicted vector generator 306 at step S305 are motion vectors of adjacent blocks that have been derived in the same search step and are stored in the motion vector memory 202. The motion vectors provided to the predicted vector generator 306 at step S705, on the other hand, are the motion vectors stored in the memory B. In the first search step, the motion vectors stored in the memory B are the initial motion vectors. In the second and subsequent search steps, the motion vectors stored in the memory B are motion vectors of adjacent blocks that have been derived in the previous search step. As described above, the motion vectors provided to the predicted vector generator 306 are used for deriving a predicted vector in RD optimization.

The operation at step S306 is the same as the operation at step S306 in FIG. 3. At step S707, the controller 300 stores the derived motion vectors into the memory A in the motion vector memory 203.

When it is determined at step S301 that the process for all of the MBs has been completed (Yes at step S301), the controller 300 determines whether to end the search (step S708). The controller 300 may determine whether to end the search on the basis of the result of determination as to whether or not sufficiently accurate motion vectors have been obtained, on the basis of a predetermined criterion. In other words, when the controller 300 determines that sufficiently accurate motion vectors have been obtained, the controller 300 may end the search. For example, the controller 300 may determine that sufficiently accurate motion vectors have been obtained when the differences between motion vectors derived in successive search steps are smaller than a predetermined criterion as described below.

For example, when the percentage of MBs in which motion vectors derived have changed from motion vectors derived in the same MBs in the previous search step is smaller than a predetermined threshold, the controller 300 may determine to end the search. Alternatively, for example, when the average of the magnitudes of the amounts of change of motion vectors derived in MBs from motion vectors derived in the same MBs in the previous search step is smaller than a predetermined threshold, the controller 300 may determine to end the search. Alternatively, for example, the controller 300 may calculate the magnitude of the average of the amounts of change of motion vectors derived in MBs from motion vectors in the same MBs that have been derived in the previous search step. The controller 300 may calculate the ratio of the calculated magnitude of the average to the magnitude of the average of the amounts of change derived in the previous search step. When the calculated ratio is greater than or equal to a predetermined threshold, the controller 300 may determine to end the search.

The controller 300 may abort the search depending on the number of search steps even when it is not determined to end the search under any of the conditions described above. For example, when the number of search steps reaches a predetermined upper limit, the controller 300 may determine to end the search.

The controller 300 may change a method for determining whether to end search or a threshold used for the determination in accordance with a coding type or parameter. The coding type indicates P pictures or B pictures, or reference pictures or non-reference pictures, for example. Examples of coding parameters include the bit rate and the quantization step size.

When the controller 300 determines not to end the search because the search end condition is not satisfied at step S708 (No at step S708), the operation of the motion vector searching apparatus 10 returns to step S700.

In the second and subsequent search steps, the controller 300 sends an instruction to the switcher 307 to replace the memory areas allocated to the memory A and the memory B with each other at step S700. The switcher 307 replaces the memory areas allocated to the memory A and the memory B with each other in accordance with the instruction which is received. In other words, the switcher 307 replaces the memory area to be accessed as the memory A and the memory area to be accessed as the memory B with each other. This allows motion vectors that have been derived as a result of search in a search step to be retrieved in the predicted vector calculation process in the next search step. In other words, motion vectors derived as a result of search in a search step are provided to the predicted vector generator 306 in the predicted vector calculation process in the next search step.

When the controller 300 determines to end the search because the search end condition is satisfied at step S708 (Yes at step S708), the motion vector searching apparatus 10 ends the search for motion vectors for the frame stored in the input image memory 200 as the encoding object image.

The present exemplary embodiment described above has the advantageous effect of improving the degree of parallelism of parallel processing in motion vector search without decreasing the accuracy of motion vectors.

This is because in a search step, the predicted vector generator 306 uses, instead of motion vectors of adjacent blocks derived in the same search step, motion vectors of the adjacent blocks that have been derived in the previous search step. Since the motion vectors of the adjacent blocks in a search step are not referred to in the same search step, the motion vector search process can be independently performed for every block in the frame. In other words, the motion vector search process for all of the blocks in the frame can be performed in parallel. Thus a high degree of parallelism in the motion vector search process for all of the blocks in the frame can be achieved. In motion vector search based on the technology disclosed in NPL 1, for example, when an image of full high definition (1920 pixels×1080 pixels) is processed in units of a MB of 16 pixels×16 pixels, the degree of parallelism is about 60 MBs per frame at the highest. In the present exemplary embodiment, in contrast, all of the MBs can be processed in parallel. Accordingly, the degree of parallelism in the present exemplary embodiment is 8160 at the maximum. When a many-core accelerator with 50 cores or more or a many-core GPU with several thousand cores or more is used, parallel processing for searching for motion vectors can be performed with a high degree of parallelism using many cores. In the present exemplary embodiment, the amount of processing is larger because multiple search steps are performed per frame. However, since parallel processing is performed using many cores to improve the efficiency of processing, the processing time is reduced.

Further, reference to motion vectors of adjacent blocks that have derived in the same search step is prohibited but instead motion vectors derived in the previous search step are referred to in the present exemplary embodiment. For this reason, the effect of RD optimization does not significantly decrease and therefore sufficiently accurate motion vectors can be obtained. Therefore, reduction of the compression rate and degrading of image quality can be prevented. Moreover, in the present exemplary embodiment, reduction of the accuracy of motion vectors derived is minimized by repeating a search step for each frame.

<Second Exemplary Embodiment>

A second exemplary embodiment of the present invention will be described next in detail with reference to drawings.

FIG. 14 is a block diagram illustrating an exemplary configuration of a video encoder 1 according to the present exemplary embodiment. The video encoder 1 of the present exemplary embodiment has the same configuration as that of the video encoder 1 of the first exemplary embodiment.

FIG. 6 is a block diagram illustrating an exemplary configuration of a motion vector searching apparatus 10 according to the present exemplary embodiment. The motion vector searching apparatus 10 of the present exemplary embodiment has the same configuration as that of the motion vector searching apparatus 10 of the first exemplary embodiment.

An operation of the motion vector searching apparatus 10 of the present exemplary embodiment will be described next in detail with reference to drawings.

FIG. 7 is a flowchart illustrating an example of operation of the motion vector searching apparatus 10 according to the present exemplary embodiment. The operation of the motion vector searching apparatus 10 according to the present exemplary embodiment is similar to that of the operation of the motion vector searching apparatus 10 according to the first exemplary embodiment, except for differences described below.

At step S304 in FIG. 7, a controller 300 of the present exemplary embodiment gradually narrows a search area for which candidate vectors are generated in accordance with the number of search steps performed for the same frame in a predetermined way. Specifically, the controller 300 sets a search area that becomes narrow as the number of search steps for the same frame increases. The controller 300 generates candidate vectors on the basis of the set search area.

Figure 15:
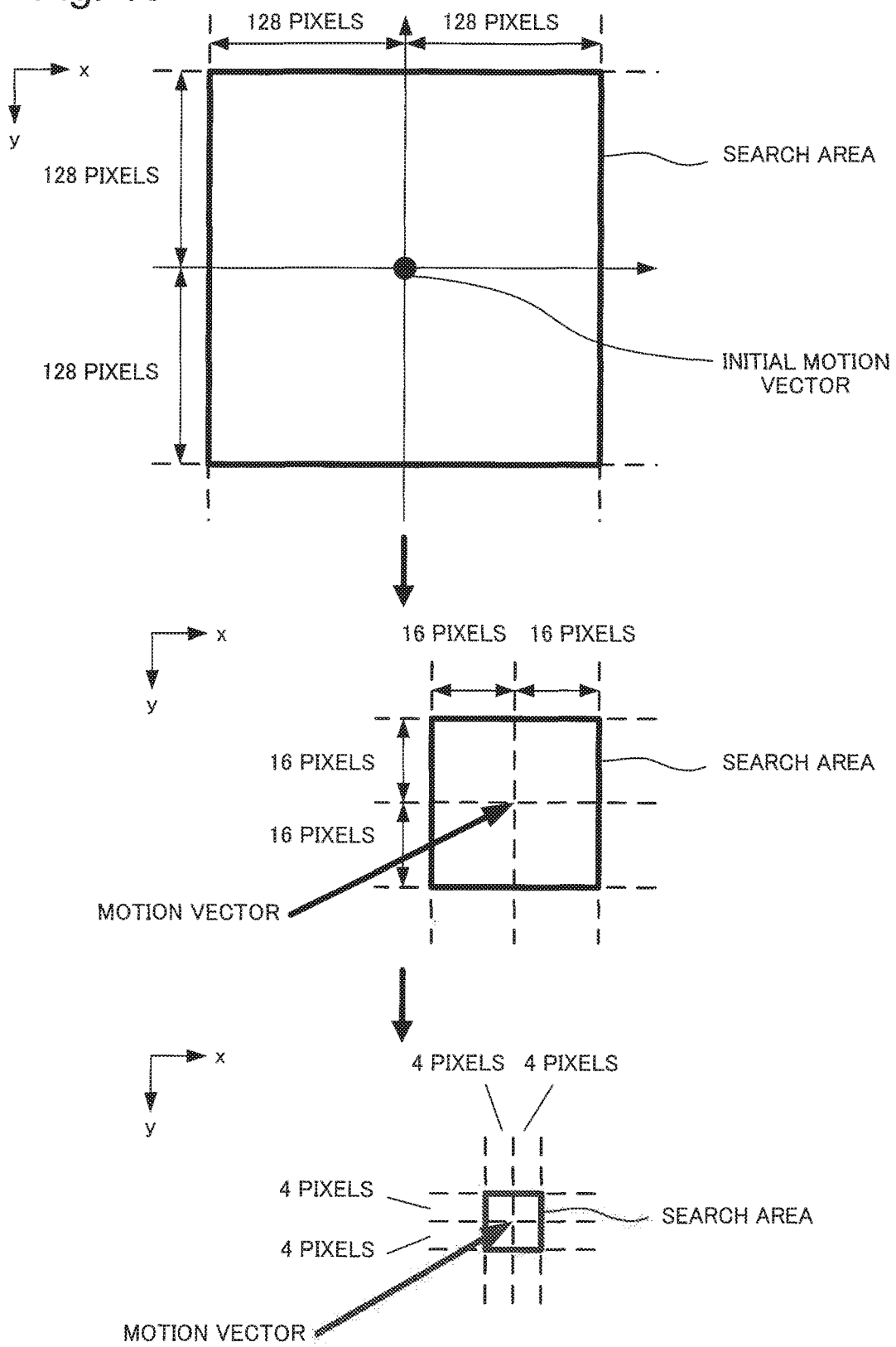
FIG. 15 is a diagram schematically illustrating search areas in search steps in the second exemplary embodiment.

FIG. 15 is a diagram schematically illustrating search areas in search steps.

In the first search step, the controller 300 may set the widest search area among the search areas set in the search steps performed for the same frame. For example, in the example illustrated in FIG. 15, the search area in the first search step is from 128th pixel to the right of the position indicated by an initial vector for the location of an MB of interest to the 128th pixel to the left of the position, and from the 128th pixel above the position to the 128th pixel below the position as illustrated in the top part of FIG. 15. The initial vector is a zero vector, for example, as noted earlier. In that case, the search area in the first search step is, for example, from the 128th pixel to the right of the position of the MB of interest to the 128th pixel to the left of the position of the MB, and from the 128th pixel above the position of the MB to the 128th pixel below the position of the MB as illustrated in the top part of FIG. 15. Assume that the coordinate system of the image is represented by the x axis whose right hand side is the positive+direction and the y axis that is orthogonal to the x axis and whose lower side is positive+direction. For example, a line made up of points whose x coordinates are smaller than the x coordinates of the MB of interest by p pixels, a line made up of points whose x coordinates are greater than the x coordinates of the MB of interest by q pixels, and a region between the lines are referred to as the area from pixel −p to pixel +q in the x-coordinate direction with respect to the position of the MB of interest. Then the search area in the first search step is the area from pixel −128 to pixel +128 in both of the vertical direction (i.e. the y-axis direction) and the horizontal direction (i.e. the x-axis direction) with respect to the MB of interest. Note that the image coordinate system is not limited to the example described above.

In the second search step, the controller 300 may set a search area narrower than the search area set in the first search step. For example, in the example illustrated in the middle part of FIG. 15, the search area in the second search step is the area from the 16th pixel to the right of the position indicated by a motion vector derived in the first search step for the location of the MB of interest to the 16th pixel to the left of the position and from the 16th pixel above the position to the 16th pixel below the position. If the image coordinate system is as described above, the search area in the second search step is the area from pixel −16 to pixel +16 in both of the vertical and horizontal directions with respect to the position indicted by a motion vector derived in the first search step for the location of the MB of interest.

In the third search step, the controller 300 may set a search area narrower than the search area set in the second search step. For example, the search area in the third search step in the example illustrated in the bottom part of FIG. 15 is the area from the fourth pixel to the right of the position indicated by a motion vector derived in the second step for the location of the MB of interest to the fourth pixel to the left of the position and from the fourth pixel above the position to the fourth pixel below the position. If the image coordinate system is as described above, the search area in the third search step is the area from pixel −4 to pixel +4 in both of the vertical and horizontal directions with respect to the position indicated by the motion vector derived in the second search step for the location of the MB of interest. The size of a search area is not limited to the example described above.

The present exemplary embodiment described above has the same advantageous effect as the first exemplary embodiment.

The reason is the same as the reason for the advantageous effect of the first exemplary embodiment.

The present exemplary embodiment further has the effect of decreasing the total amount of computation for the entire motion vector processing.

The reason is that the controller 300 gradually narrows the search area in accordance with the number of search steps performed for the same frame. Since search is performed in the search area that is narrowed in accordance with the number of search steps, the total sum amount of computation for the entire motion vector processing is reduced. Accordingly, the processing is further sped up.

<Third Exemplary Embodiment>

A third exemplary embodiment of the present invention will be described next with reference to drawings.

Figure 16:
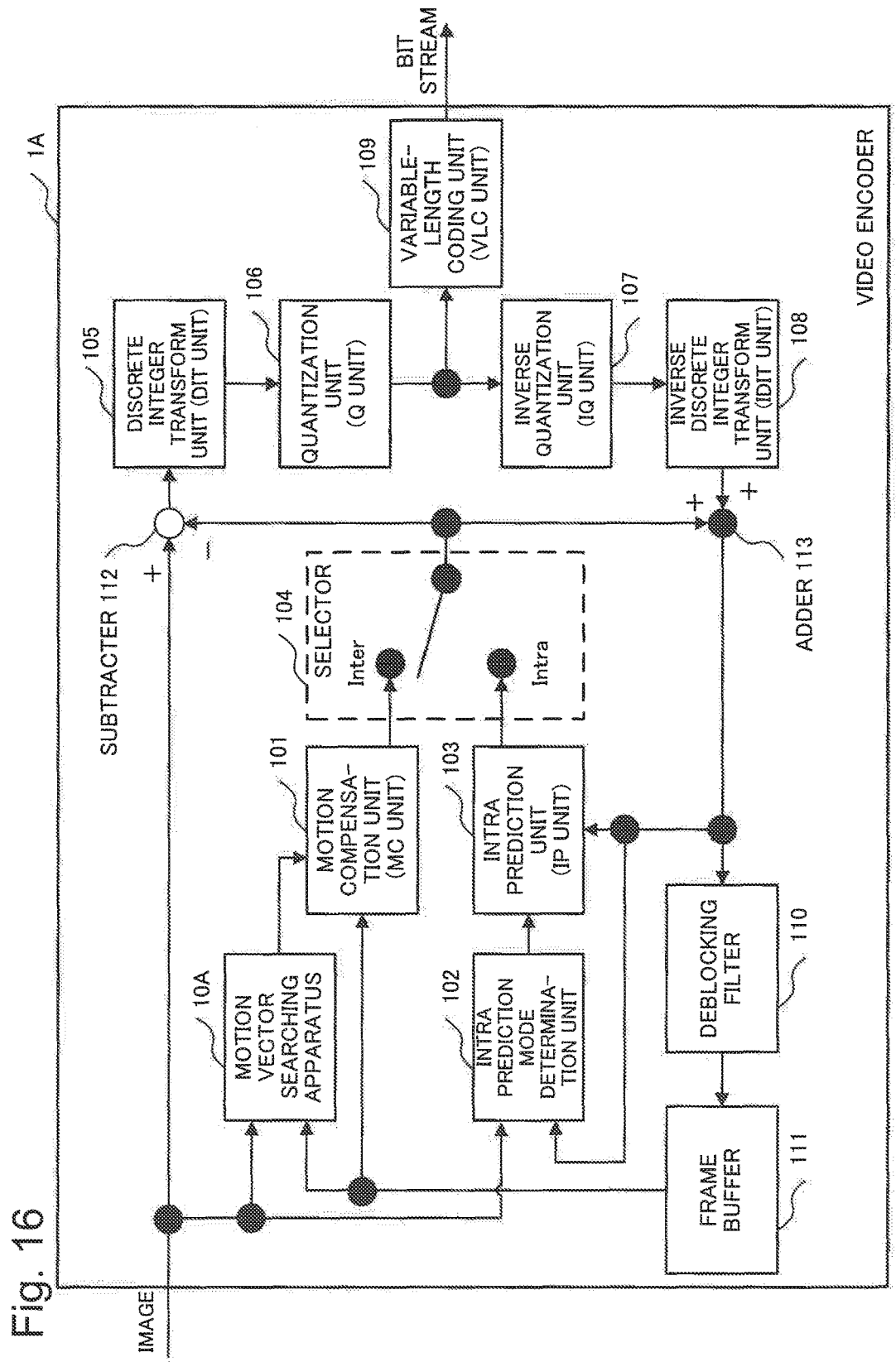
FIG. 16 is a block diagram illustrating an exemplary configuration of a video encoder 1A according to the third exemplary embodiment.

FIG. 16 is a diagram illustrating a configuration of a video encoder 1A according to the present exemplary embodiment. Comparing FIG. 16 with FIG. 14, the video encoder 1A of the present exemplary embodiment differs from the video encoder 1 of the first exemplary embodiment in that the video encoder 1A of the present exemplary embodiment includes a motion vector searching apparatus 10A instead of the motion vector searching apparatus 10.

Figure 9:
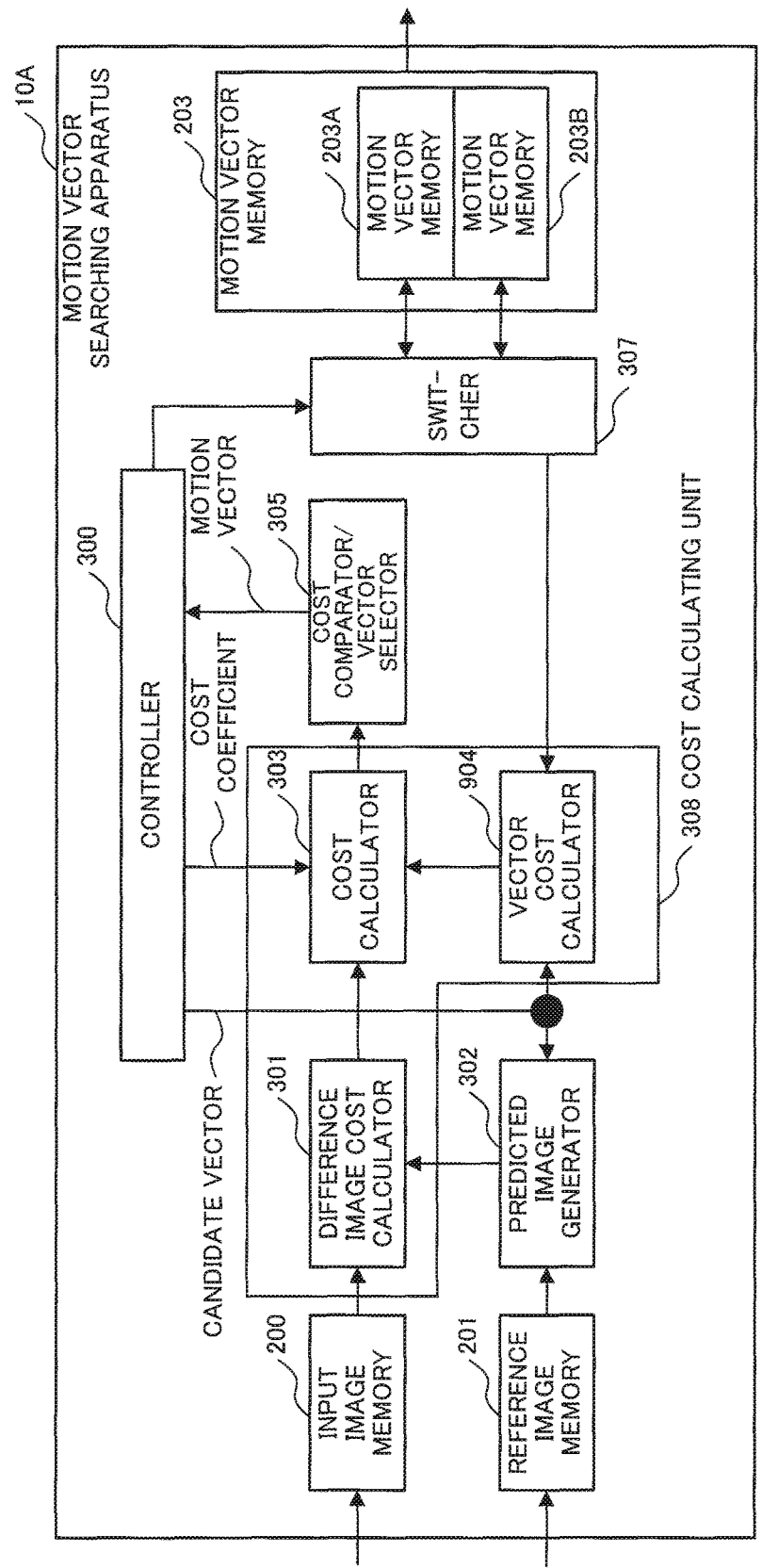
FIG. 9 is a block diagram illustrating an exemplary configuration of a motion vector searching apparatus 10A according to the third exemplary embodiment of the present invention.

FIG. 9 is a block diagram illustrating an exemplary configuration of the motion vector searching apparatus 10A according to the present exemplary embodiment.

Comparing the configuration of the motion vector searching apparatus 10A in FIG. 9 with the configuration of the motion vector searching apparatus 10 of the first exemplary embodiment in FIG. 6, the motion vector searching apparatus 10A includes a vector cost calculator 904 in place of the vector cost calculator 304. Further, the motion vector searching apparatus 10A includes a cost calculating unit 908 in place of the cost calculating unit 308. The cost calculating unit 908 includes a difference image cost calculator 301, a cost calculator 303, and a vector cost calculator 904. The motion vector searching apparatus 10A does not include the predicted vector generator 306. The other components of the motion vector searching apparatus 10A are the same as the components of the motion vector searching apparatus 10 that are labeled with the same reference numerals.

The vector cost calculator 904 retrieves motion vectors of related blocks that have been derived in the previous search step from a motion vector memory 203B. The vector cost calculator 904 then uses the retrieved motion vectors of the related blocks that have been derived in the previous search step to calculate vector costs.

An operation of the motion vector searching apparatus 10A according to the present exemplary embodiment will be described next in detail with reference to drawings.

FIG. 7 is a flowchart illustrating an example of operation of the motion vector searching apparatus 10A according to the present exemplary embodiment. The operation of the motion vector searching apparatus 10A of the present exemplary embodiment is similar to the operation of the motion vector searching apparatus 10 of the first exemplary embodiment, except for the method for calculating vector cost at step S705.

In general, motion vectors in a temporally or spatially adjacent blocks are similar to one another. Therefore, for deriving a motion vector of an encoding object block, motion vectors in blocks that are in the same frame as the encoding object block and are located around the encoding object block are used. However, in order to use motion vectors in other blocks in the same frame that are adjacent to the encoding object block to derive a motion vector for the encoding object block, the motion vectors used for the derivation need to have been already derived before derivation. Therefore, encoding object blocks are selected one after another in the raster scan order, for example, from among the blocks included in the same frame, and a motion vector in each selected encoding object block is derived. When a motion vector is derived in an encoding object block, motion vectors in blocks preceding the encoding object block in the raster scan order are used.

Likewise, the motion estimation unit 100 illustrated in FIG. 2 performs derivation of motion vectors in the blocks in a frame in the raster scan order, once per block in the frame. Specifically, first the predicted vector generator 306 uses motion vectors derived in blocks located to the left of and above an encoding object block in the same frame to calculate a predicted vector in accordance with a procedure specified in a coding standard. Then the vector cost calculator 304 calculates vector costs on the basis of the relationship between the predicted vector and candidate vectors. Then the cost comparator/vector selector 305 selects a motion vector from among the candidate vectors on the basis of the calculated vector costs. As stated above, FIGS. 4 and 5 illustrate blocks whose motion vectors are used for calculating a predicted vector in an encoding object block.

On the other hand, motion vectors of blocks located to the right of and below the encoding object block, which succeed the encoding object block in the same frame in the raster scan order, have not been derived when a motion vector for the encoding object block is derived. The predicted vector generator 306 therefore cannot use such motion vectors when deriving a motion vector for the encoding object block.

However, among the blocks below and to the right of the encoding object block, there are blocks influenced by the encoding object block. In other words, among the blocks below and to the right of the encoding object block, there are blocks for which predicted vectors are calculated using a motion vector in the encoding object block. In the following description, a block for which a predicted vector is calculated using a motion vector of an encoding object block and a block whose motion vector is used for calculation of a predicted vector of an encoding object block will be referred to as related blocks. A block whose motion vector is used for calculating a predicted vector of an encoding object block is referred to as a first related block. A block whose predicted vector is calculated using a motion vector of an encoding object block is referred to as a second related block.

Figure 10:
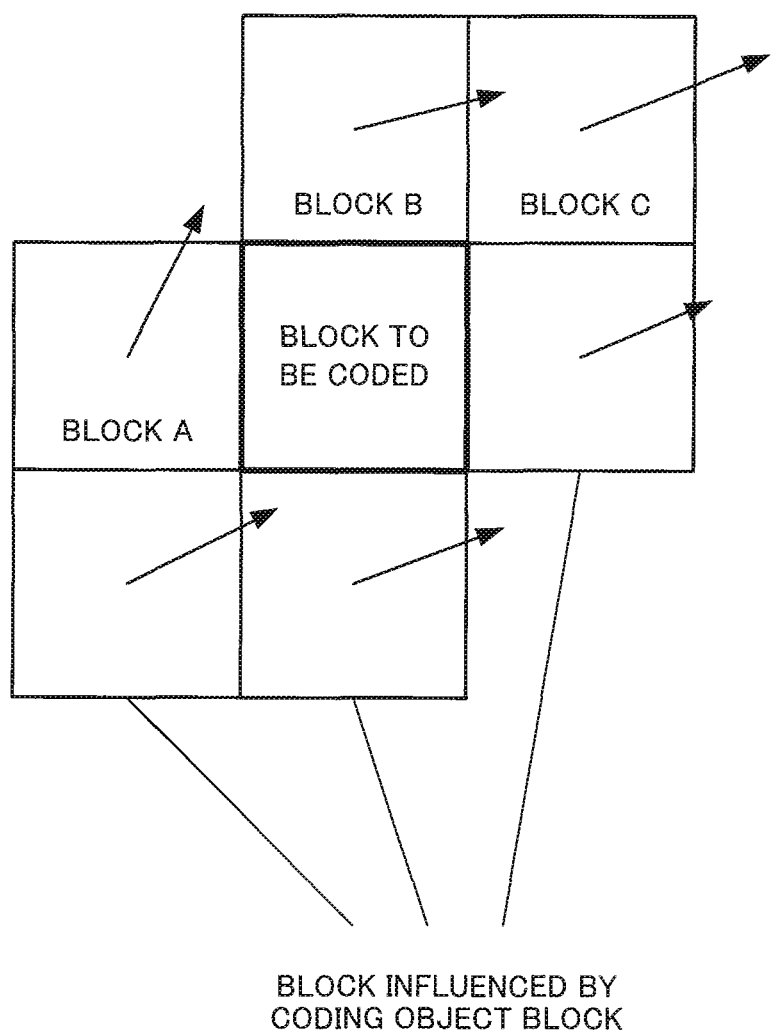
FIG. 10 is a diagram illustrating examples of blocks relating to an encoding object block in deriving motion vectors.

FIG. 10 is a diagram illustrating examples of blocks related to an encoding object block in deriving motion vectors. In H.264, motion vectors in block A, block B and block C in FIG. 10 are used for calculating a predicted vector of the encoding object block. The motion vector of the encoding object block is used for calculating predicted vectors of the adjacent blocks to the right of, lower left of, and below the encoding object block in FIG. 10.

Taking into consideration the relationship with motion vectors of the blocks to the right of and below an encoding object block, it can be effective in RD optimization described above to use the motion vectors in the blocks to the right of and below the encoding object block in addition to motion vectors of blocks to the left of and above the encoding object block. However, the motion estimation unit 100 performs motion vector search only once per block in each frame as described above. The motion estimation unit 100 therefore is not able to use motion vectors, in the same frame, in blocks that succeed the encoding object block in the order in which motion vectors are derived.

In the present exemplary embodiment, motion vectors of the related blocks in the previous search step described above, which are stored in the motion vector memory 203B, are provided to the vector cost calculator 904. In other words, the vector cost calculator 904 retrieves the motion vectors of the related blocks that have been derived in the previous search step from the motion vector memory 203B. The vector cost calculator 904 then calculates vector costs using the retrieved motion vectors of the related blocks that have been derived in the previous search step.

In H.264, the related blocks described above are adjacent blocks to the right, lower left and below an encoding object block, in addition to adjacent blocks to the left, above, and upper right of the encoding object block in FIG. 10. In H.264, a motion vector of the encoding object block influences predicted vectors of the adjacent blocks to the right, lower left and below the encoding object block. Motion vectors of the adjacent blocks to the left, above, and upper right of the encoding object block influence a predicted vector of the encoding object block. The adjacent blocks to the left, above and upper right of the encoding object block are block A, block B and block C, respectively. In H.264, the vector cost calculator 904 retrieves, from the motion vector memory 203B, the motion vectors of the adjacent blocks to the left, above, upper right, right, lower left and below the encoding object block which have been derived in the previous search step. The vector cost calculator 904 then calculates vector costs using the motion vectors, which have been derived in the previous search step, of the adjacent blocks to the left, above, upper right, right, lower left and below the encoding object block.

For example, the vector cost calculator 904 can calculate the vector costs by calculating R in Equation 1 in accordance with Equation 2.

$$R = \tfrac{3}{6} * Rc + \tfrac{1}{6} * Rr + \tfrac{1}{6} * R11 + \tfrac{1}{6} * R1 \qquad \text{(Equation 2)}$$

Here, Rc, Rr, R11 and R1 are the amounts of code produced in encoding of the motion vectors of the adjacent blocks to the right, lower left and below, respectively, the encoding object block. The character "*" is an operator representing multiplication. The vector cost calculator 904 may calculate the vector costs using other method.

When an encoding object block satisfies a condition prescribed in a coding method, a coding mode in which information about predicted vectors of adjacent blocks is reused to significantly reduce the amount of code may be set for the encoding object block. Such a coding mode will be referred to as an omission coding mode in the following description. Examples of such the omission coding mode include coding modes called SKIP mode in H.264 and Merge mode in H.265. For an encoding object block for which the omission coding mode is set, the video encoder 1A does not encode a motion vector. When the encoded video is decoded, motion vectors of the blocks for which the omission coding mode is set are inferred from motion vectors of other blocks, for example. In the description of the present exemplary embodiment, a block whose motion vector is used for inferring a motion vector of a block for which the omission coding mode is set is referred to as a reuse block. The location of the reuse block with respect to a block for which the omission coding mode is set is dependent on the coding method.

If the omission coding mode is used, for example the selector 104 of the video encoder 1A may determine, for each block, whether to set the omission coding mode for the block based on a predetermined criterion which depends on the coding method. The selector 104 may send information identifying blocks for which the omission coding mode is set to the motion vector searching apparatus 10A. Then the controller 300 may identify bocks that are reuse blocks described above for a block for which the omission coding mode is set. The controller 300 may store the identifiers of the identified reuse blocks into the motion vector memory 203A, for example.

When calculating rate distortion costs, the vector cost calculator 904 may adjust derived rate distortion costs so that a motion vector to be used for any of the blocks for which the omission coding mode described above is set is preferentially selected. For example, the vector cost calculator 904 may subtract a predetermined value from the rate distortion cost calculated for a candidate vector that is equal to a motion vector used in any of the blocks for which the omission coding mode described above is set. For example, for a motion vector selected as a Merge mode vector for an adjacent block among candidate vectors of an encoding object block, the vector cost calculator 904 may subtract, from R, an amount by which the code amount is reduced through setting the Merge mode.

Specifically, the vector cost calculator 904 determines whether or not an encoding object block is a reuse block. If the identifier of the encoding object block is stored in the motion vector memory 203B as a reuse block identifier, the vector cost calculator 904 may determine that the encoding object block is a reuse block. Otherwise, the vector cost calculator 904 may determine that the encoding object block is not a reuse block. If it is determined that the encoding object block is a reuse block, the vector cost calculator 904 may adjust the rate distortion cost of a candidate vector that is equal to the motion vector of the encoding object block, which is stored in the motion vector memory 203B, using an offset or the amount of code as described above.

The present exemplary embodiment described above has the same advantageous effect as that of the first exemplary embodiment. The reason is the same as the reason for the advantageous effect of the first exemplary embodiment.

The controller 300 of the present exemplary embodiment may perform the same operation as the controller 300 of the second exemplary embodiment performs. In that case, the present exemplary embodiment further has the same advantageous effect as that of the second exemplary embodiment. The reason is the same as the reason for the advantageous effect of the second exemplary embodiment.

The present exemplary embodiment further has the advantageous effect of improving the efficiency of compression and image quality.

The reason is that the vector cost calculator 904 uses the motion vector of a second related block in addition to the motion vector of a first related block to calculate the vector cost. As described above, the first related block is a block whose motion vector is used for calculating a predicted vector of an encoding object block. The second related block is a block whose predicted vector is calculated using the motion vector of the encoding object vector. In the present exemplary embodiment, the search step is performed a plurality of times per frame similarly to in the first and second exemplary embodiments. Motion vectors used by the vector cost calculator 904 of the present exemplary embodiment are motion vectors derived in the previous search step among a plurality of search steps for the same frame. Accordingly, the motion vectors of second related blocks that have been derived in the previous search step can be used in the present exemplary embodiment, unlike a case of performing only one motion vector search using motion vectors of adjacent blocks in the same frame. In the present exemplary embodiment, therefore, it is possible to perform RD optimization that takes into consideration the relationship with the motion vectors of second related blocks, such as a block to the right of the encoding object block and a block below the encoding object block. This improves the efficiency of compression in video encoding using derived motion vectors. An unnatural motion vector field including a motion vector that is discontinuous with the motion vectors of surrounding blocks can cause noise. If noise occurs, the image quality of the encoded video is degraded. In the present exemplary embodiment, the possibility of deriving motion vectors that are discontinuous with the motion vectors of surrounding blocks is reduced in the encoding object block.

Accordingly, occurrence of noise due to unnatural motion vector fields is minimized, so that the image quality of the encoded video improves.

<Fourth Exemplary Embodiment>

A fourth exemplary embodiment of the present invention will be described next in detail with reference to drawings.

Figure 17:
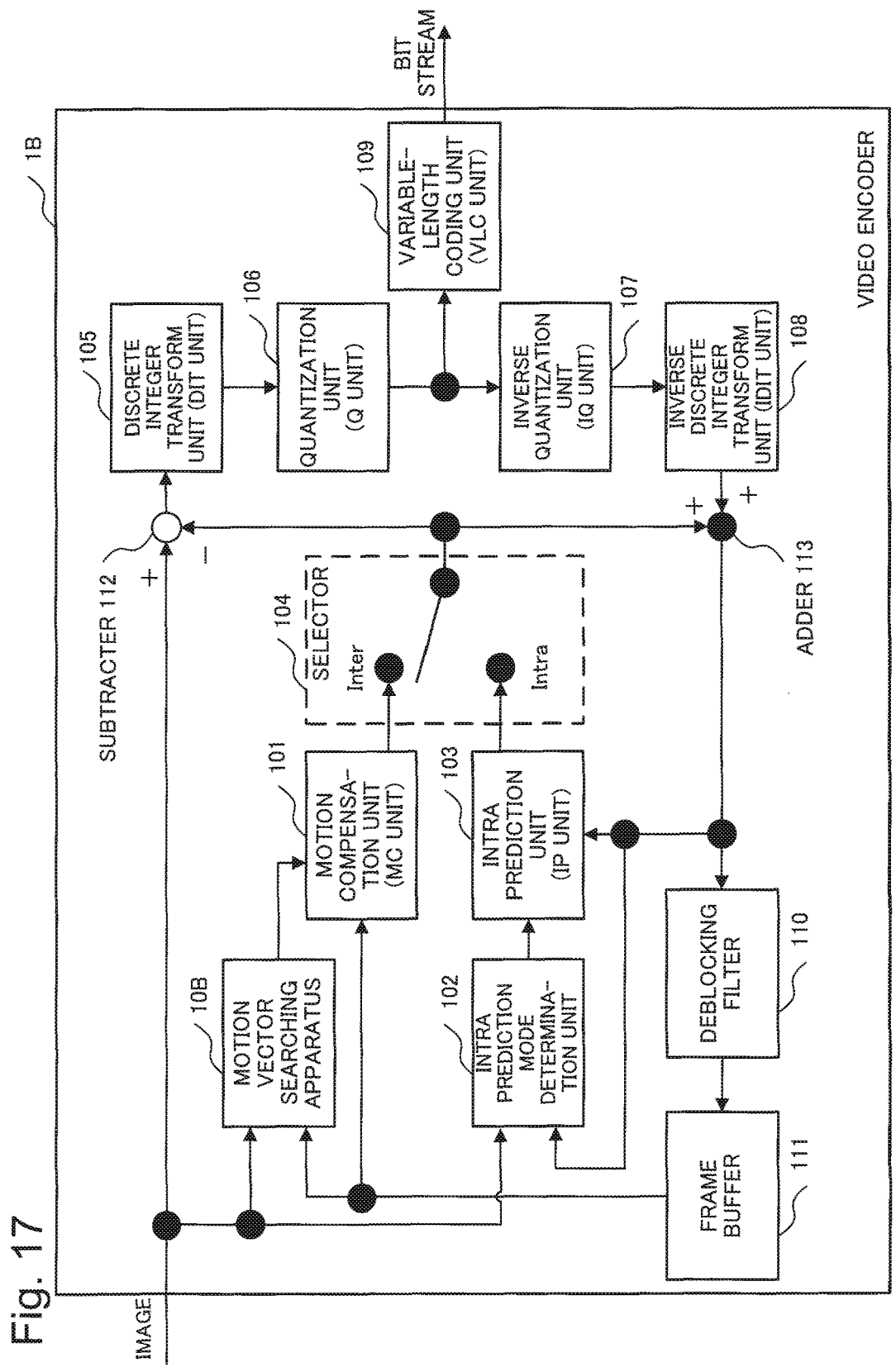
FIG. 17 is a block diagram illustrating an exemplary configuration of a video encoder 1B according to the fourth exemplary embodiment.

FIG. 17 is a block diagram illustrating an exemplary configuration of a video encoder 1B according to the present exemplary embodiment. Comparing FIG. 17 with FIG. 16, the video encoder 1B of the present exemplary embodiment differs from the video encoder 1A of the second exemplary embodiment in that the video encoder 1B of the present exemplary embodiment includes a motion vector searching apparatus 10B instead of the motion vector searching apparatus 10A.

Figure 11:
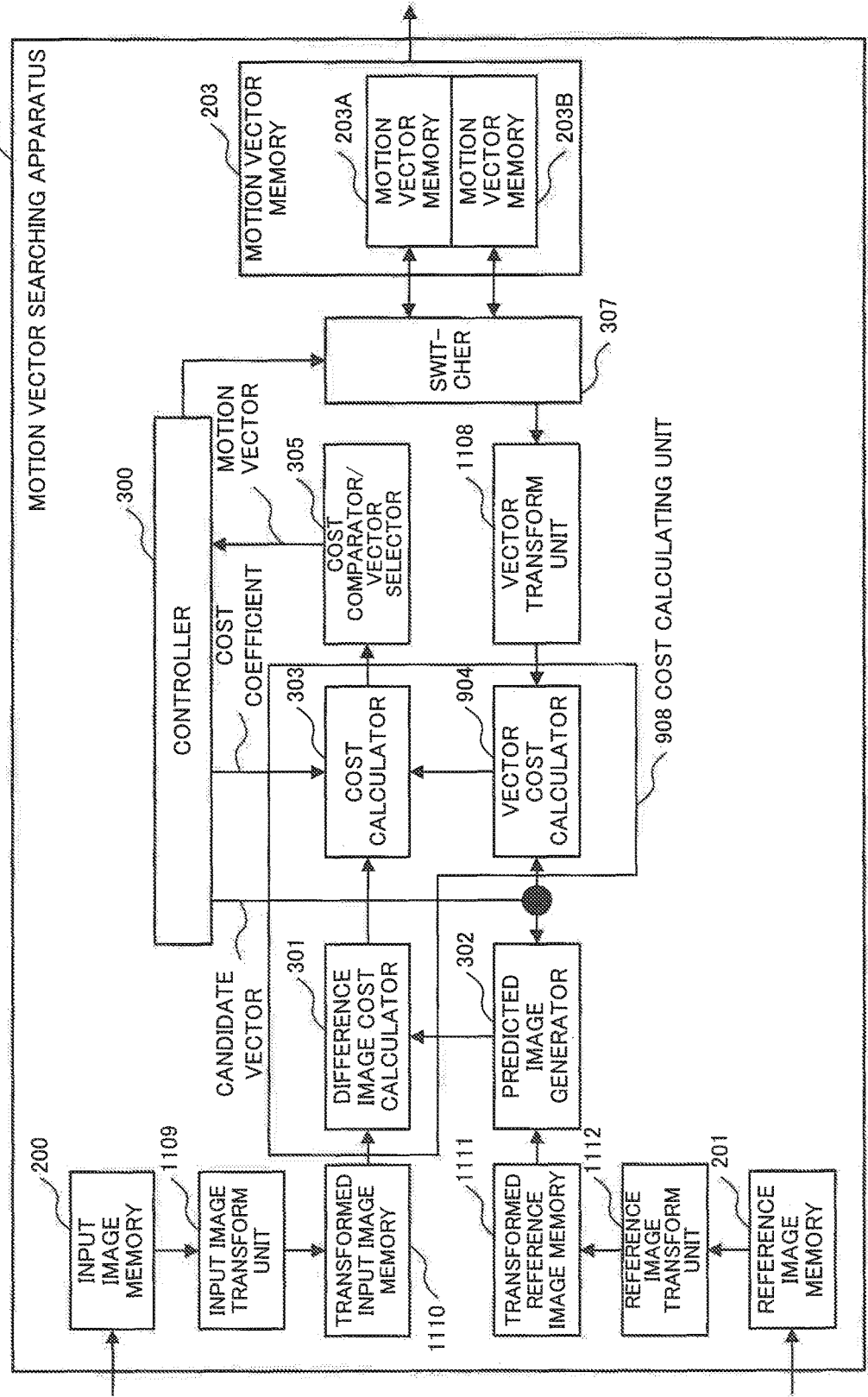
FIG. 11 is a block diagram illustrating an exemplary configuration of a motion vector searching apparatus 10B according to a fourth exemplary embodiment.

FIG. 11 is a block diagram illustrating an exemplary configuration of the motion vector searching apparatus 10B according to the present exemplary embodiment. Comparing the configuration of the motion vector searching apparatus 10B in FIG. 11 with the configuration of the motion vector searching apparatus 10A of the second exemplary embodiment in FIG. 9, the motion vector searching apparatus 10B further includes a vector transform unit 1108. The motion vector searching apparatus 10B further includes an input image transform unit 1109, a transformed input image memory 1110, a transformed reference image memory 1111, and a reference image transform unit 1112. The other components of the motion vector searching apparatus 10B are the same as the components of the motion vector searching apparatus 10A of the second exemplary embodiment that are labeled with the same reference numerals.

The input image transform unit 1109 retrieves an input image stored in an input image memory 200. The input image transform unit 1109 then applies a predetermined transform that depends on the number of search steps to the retrieved input image. The input image transform unit 1109 stores the transformed input image in the transformed input image memory 1110.

The transformed input image memory 1110 stores a transformed input image.

The difference image cost calculator 301 retrieves a transformed input image from the transformed input image memory 1110. The difference image cost calculator 301 calculates a difference image between a predicted image provided from the predicted image generator 302 with the transformed input image provided from the transformed input image memory 1110.

The reference image transform unit 1112 retrieves a reference image stored in the reference image memory 201. The reference image transform unit 1112 then applies a predetermined transform that depends on the number of search steps to the retrieved reference image. The reference image transform unit 1112 stores the transformed reference image in the transformed reference image memory 1111.

The transformed reference image memory 1111 stores a transformed reference image.

The predicted image generator 302 retrieves a transformed reference image from the transformed reference image memory 1111. The predicted image generator 302 generates a predicted image by performing a motion compensation process on the basis of candidate vectors provided from a controller 300 by using the transformed reference image stored in the transformed reference image memory 1111.

The input image transform unit 1109 and the reference image transform unit 1112 perform the same transform in the same search step. The input image transform unit 1109 and the reference image transform unit 1112 perform a transform that reduces an image, for example, by a reduction ratio according to the number of search steps as the predetermined transform mentioned above. Any of existing methods for reducing an image may be used.

The vector transform unit 1108 transforms a motion vector stored in a motion vector memory 203B depending on a reduction ratio of a transformed input image and a transformed reference image in the current search step. The vector transform unit 1108 first retrieves a motion vector stored in the motion vector memory 203B. If the reduction ratio in the current search step is different from the reduction ratio in the previous search step in which the retrieved motion vector has been derived, the vector transform unit 1108 transforms the retrieved motion vector so that the transformed retrieved motion vector becomes consistent with the reduction ratio in the current search step. For example, if the reduction ratio in the current search step is 1 and the reduction ratio in the previous search step is ½, the vector transform unit 1108 applies a transform for enlarging the motion vector by a factor of 2 to the retrieved motion vector. The vector transform unit 1108 then provides the transformed motion vector to a vector cost calculator 904.

The controller 300 provides a candidate vector of a size consistent with the reduction ratio in the current search step to the predicted image generator 302 and the vector cost calculator 904.

An operation of the motion vector searching apparatus 10B according to the present exemplary embodiment will be described next in detail with reference to drawings.

Figure 12:
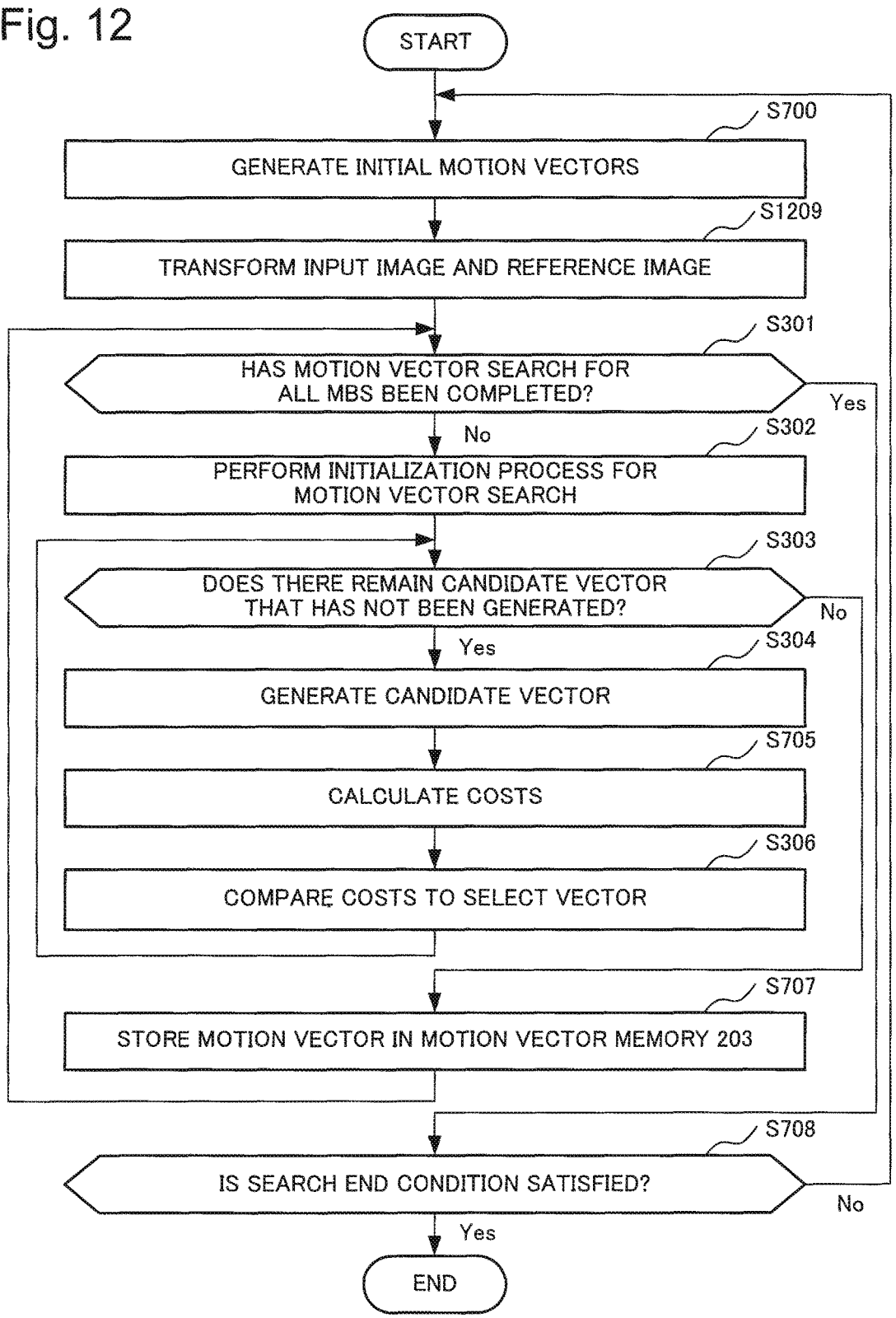
FIG. 12 is a flowchart illustrating an example of operation of the motion vector searching apparatus 10B according to the fourth exemplary embodiment.

FIG. 12 is a flowchart illustrating an example of operation of the motion vector searching apparatus 10B according to the present exemplary embodiment. Comparing FIG. 12 with FIG. 7, the motion vector searching apparatus 10B of the present exemplary embodiment performs step S 1209 after step S700.

At step S1209, the input image transform unit 1109 applies a predetermined transform according to the number of search steps to an input image retrieved from the input image memory 200. The input image transform unit 1109 stores the transformed input image into the transformed input image memory 1110. The reference image transform unit 1112 applies the predetermined transform according to the number of search steps to a reference image retrieved from the reference image memory 201. The reference image transform unit 1112 stores the transformed reference image into the transformed reference image memory 1111. As described previously, the predetermined transform is image reduction, for example.

At step S304, the controller 300 may set a search area for which a candidate vector is generated, in accordance with the transform in the current search step. For example, if the transform in the first search step is reduction by a reduction ratio of ½, the controller 300 may set a search area that is reduced horizontally and vertically by a factor of 2 from a search area that would be set when the transform is not performed.

At step S705, the vector transform unit 1108 retrieves a motion vector from the motion vector memory 203B. The vector transform unit 1108 applies a transform to the motion vector retrieved from the motion vector memory 203B for canceling a difference due to the difference between the transform in the current search step and the transform in the previous search step. For example, if the transform in the previous search step is reduction with a reduction ratio of ½ as described above and no transform is performed in the current search step, the vector transform unit 1108 enlarges the retrieved motion vector by a factor of 2. The vector transform unit 1108 sends the transformed motion vector to the vector cost calculator 904.

The transform in the first search step may be reduction with a reduction ratio of ½, for example. In that case, the reduction ratio in the second and subsequent search steps may be 1, for example. In this case, no transform is performed in the second and subsequent search steps.

Transforms by the input image transform unit 1109 and the reference image transform unit 1112 are not limited to the examples described above.

For example, the reduction ratio in the first search step may be ¼, the reduction ratio in the second search step may be ½ and the reduction ratio in third and subsequent search steps may be 1. Alternatively, the reduction ratio in the first search step may be ¼, the reduction ratio in the second search step may be ½, the reduction ratio in the vertical direction may be 1 and the reduction ratio in the horizontal direction may be ½ in the third search step, and the reduction ratio in the fourth and subsequent search steps may be 1.

FIG. 13 is a diagram schematically illustrating transformed input images and transformed motion vectors used in a search process in the present exemplary embodiment. The top part of FIG. 13 illustrates the transformed input image in the first search step and initial values of motion vectors. The transformed input image in the first search step has been reduced to a size smaller than the transformed input images in the second and subsequent search steps. The initial values of the motion vectors in the first search step are zero vectors.

The middle part of FIG. 13 illustrates the transformed input image in the second search step and vectors enlarged from the motion vectors obtained in the first search step in accordance with the transform in the second search step. The bottom part of FIG. 13 illustrates the transformed input image in the third search step and vectors enlarged from the motion vectors obtained in the second search step in accordance with the transform in the third search step.

The predetermined transforms mentioned above may be reduction of the number of bits in a bit string representing a pixel value of each pixel instead of image reduction. A transform for reducing the number of bits of the bit string representing a pixel value may be performed, for example, by computation for removing a predetermined number of lower-order bits from the bit string representing each pixel value. For example, when the number of bits of a pixel value represented by an 8-bit string is reduced by 1 bit, the input image transform unit 1109 and the reference image transform unit 1112 may remove the lowest-order bit from the bit string representing the pixel value. The input image transform unit 1109 and the reference image transform unit 1112 may then set the 7-bit string resulting from the removal of the lowest-order bit as a transformed pixel value. For example, the transform in the first search step may be to reduce the number of bits of the bit string representing the pixel value of each pixel by 2 bits, and the transform in the second search step may be to reduce the number of bits of the bit string representing the pixel value of each pixel by 1 bit. In this case, the number of bits of the bit string representing the pixel value of each pixel is not changed, for example, in the third and subsequent search steps. If the transform is a transform that does not change the size of an image such as a transform that changes the number of bits of the bit string representing each pixel value, the motion vector searching apparatus 10B does not need to include the vector transform unit 1108.

Further, the predetermined transforms mentioned above may be to add pixels having pixel values calculated by interpolation between pixels in an image. In that case, the number of pixels to be added between pixels in an image may be changed from one search step to another.

The present exemplary embodiment described above has the same advantageous effects as the first, second and third exemplary embodiments. The reasons are the same as the reasons for the advantageous effects of the first, second and third exemplary embodiments.

The present exemplary embodiment further has the advantageous effect of further reducing the amount of computation required for the entire process for searching motion vectors.

The reason is that the input image transform unit 1109 applies a transform according to the number of search steps to an input image and, in addition, the reference image transform unit 1112 applies the same transform performed by the input image transform unit 1109 according to the number of search step to a reference image. In the present exemplary embodiment, an input image is reduced with a high reduction ratio and then a search process can be performed in each search area that has an extent according to the reduction ratio in the first search step in which a large search area is searched. This enables reduction of the amount of computation by an amount greater than the amount of computation added to by the transform.

In addition, in the present exemplary embodiment, a rough search can be performed with a high reduction ratio in a search step in which the accuracy of a predicted vector is low, such as the first search step, whereas search can be accurately performed with a lower reduction ratio in later search steps in which the accuracy of a predicted vector is higher. Accordingly, the motion vector searching apparatus 10B according to the present exemplary embodiment can generate smoother motion vector fields.

This improves the image quality of a video encoded using motion vectors derived by the motion vector searching apparatus 10B.

<Fifth Exemplary Embodiment>

A fifth exemplary embodiment of the present invention will be described next in detail with reference to drawings.

Figure 18:
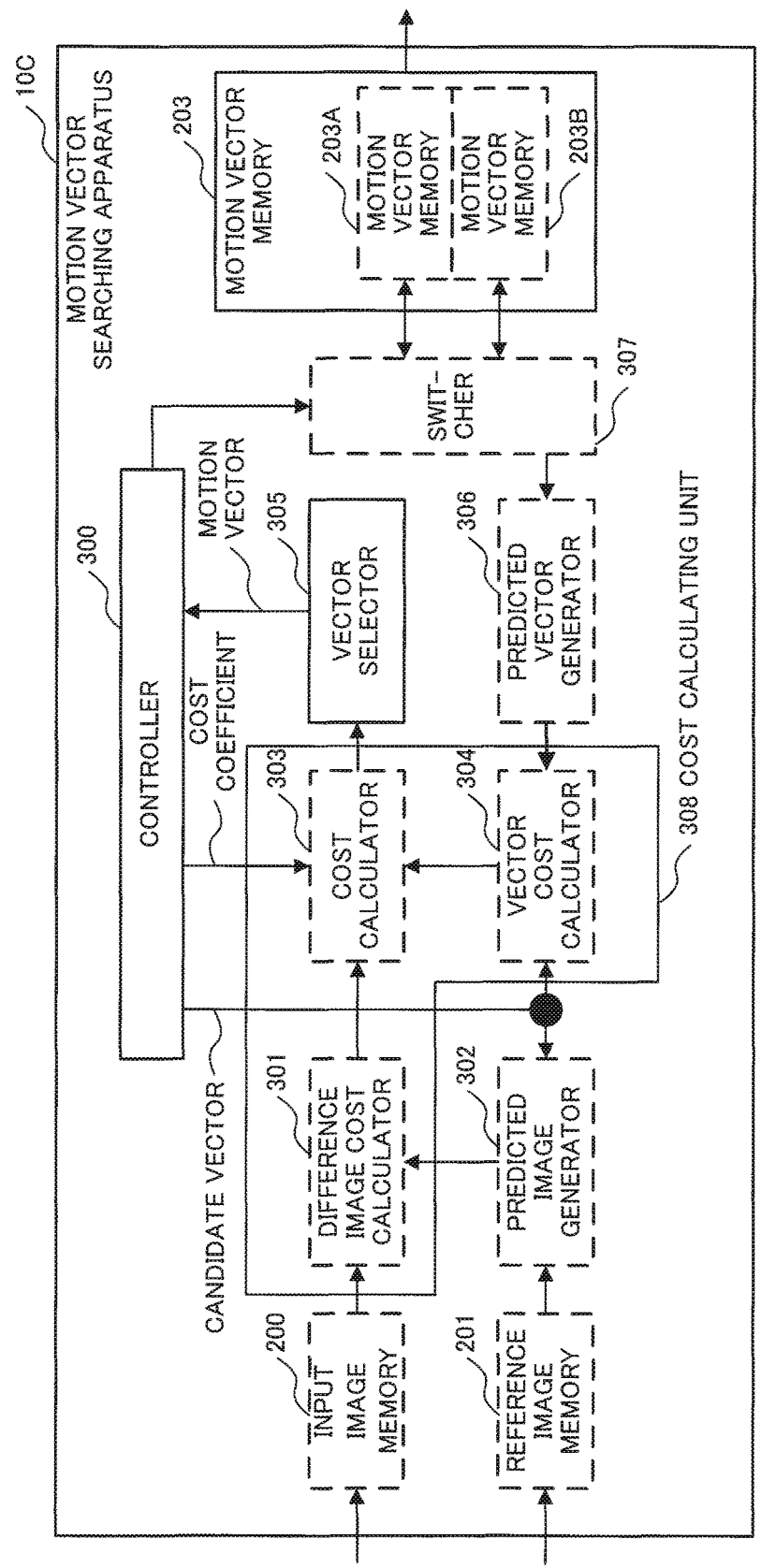
FIG. 18 is a block diagram illustrating an exemplary configuration of a video encoder 1C according to a fifth exemplary embodiment.

FIG. 18 is a diagram illustrating a configuration of a motion vector searching apparatus 10C according to the present exemplary embodiment.

Referring to FIG. 18, the motion vector searching apparatus 10C of the present exemplary embodiment includes a controller 300, a motion vector memory 203, a cost calculating unit 308, and a cost comparator/vector selector 305. The controller 300 generates candidate vectors on the basis of a predetermined search area. For each of blocks into which an input image is divided, the motion vector memory 203 stores a first motion vector selected as a motion vector which is a vector from the position of a region, which is related to a block, of a reference image to a position of the block. The cost calculating unit 308 calculates evaluation values each representing ratings of the generated candidate vectors on the basis of the first motion vector for each of adjacent blocks, the candidate vectors, the input image and the reference image. The adjacent blocks are blocks that are included in the input image and located around an object block i.e. a block of interest. The cost comparator/vector selector 305 selects as a second motion vector of the object block an optimal candidate vector with a high rating by the evaluation with the evaluation values from among the candidate vectors.

The present exemplary embodiment described above has the same advantageous effect as that of the first exemplary embodiment. The reason is the same as the reason for the advantageous effect of the first exemplary embodiment.

Exemplary embodiments of the present invention have been described mainly in a case where the coding method is H.264 or H.265. However, the present invention is not limited to applications that uses H.264 or H.265 coding methods. The present invention is also applicable to other coding methods such as VC-1, coding methods that are not included in international-standard video coding methods or the like. Only some examples of procedures for calculating difference image costs and vector costs, procedures for generating candidate vectors, image transform methods, and the like have been described. However, various procedures other than the procedures illustrated may be readily used.

Each of the apparatuses according to exemplary embodiments of the present invention described below can be implemented with a computer with a program that controls the computer, dedicated hardware, or a combination of a computer with a program controlling the computer and dedicated hardware. The apparatuses according to the exemplary embodiments of the present invention described above are the motion vector searching apparatus 10, the motion vector searching apparatus 10A, the motion vector searching apparatus 10B, the motion vector searching apparatus 10C, the video encoder 1, the video encoder 1A, the video encoder 1B and the video encoder 1C.

Figure 19:
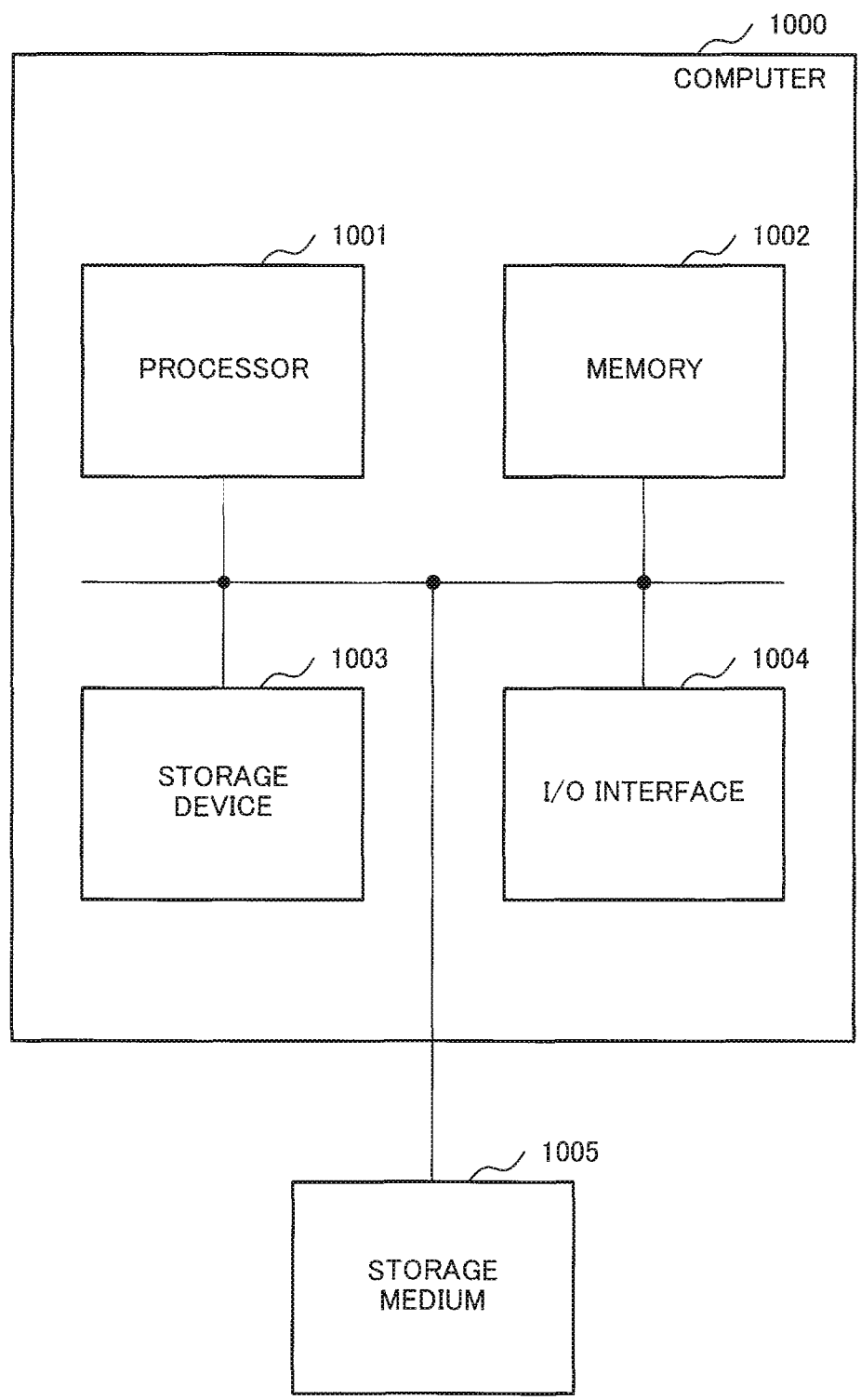
FIG. 19 is a diagram illustrating an exemplary configuration of a computer 1000 that can implement the motion vector searching apparatus according to any of the exemplary embodiments and the video encoder according to any of the exemplary embodiments.

FIG. 19 is a diagram illustrating an exemplary configuration of a computer 1000 with which a motion vector searching apparatus according to any of the exemplary embodiment of the present invention and a video encoder according to any of the exemplary embodiments of the present invention can be implemented. Referring to FIG. 19, the computer 1000 includes a processor 1001, a memory 1002 a storage device 1003, and an I/O (Input/Output) interface 1004. The computer 1000 is capable of accessing a storage medium 1005. The memory 1002 and the storage device 1003 are storage devices such as a RAM (Random Access Memory) and a hard disk, for example. The storage medium 1005 is a storage device such as a RAM or a hard disk, a ROM (Read Only Memory), or a portable storage medium. The storage device 1003 may be the storage medium 1005. The processor 1001 is capable of reading and writing data and programs on the memory 1002 and the storage device 1003. The processor 1001 is capable of accessing, through the I/O interface 1004, a video encoder, a motion vector searching apparatus, an apparatus that transmits videos, or an apparatus that receives encoded videos, for example. The processor 1001 is capable of accessing the storage medium 1005. The storage medium 1005 stores a program causing the compute 1000 to operate as any of the apparatuses according to exemplary embodiments of the present invention described above.

The processor 1001 loads the above-mentioned program stored on the storage medium 1005 into the memory 1002. The processor 1001 executes the program loaded in the memory 1002 to cause the computer 1000 to operate as any of the apparatuses according to the exemplary embodiments of the present invention described above depending on the program.

The components included in the first group listed below can be implemented, for example, with a dedicated program in which functions of the components are implemented and which is read into the memory 1002 from the storage medium 1005 storing the program, and the processor 1001 which executes the program. The first group include:

The motion estimation unit 100,
The motion compensation unit 101,
The intra prediction mode determination unit 102,
The intra prediction unit 103,
The selector 104,
The discrete integer transform unit 105,
the quantize unit 106,
The inverse quantization unit 107,
The inverse discrete integer transform unit 108,
The variable-length coding unit 109,
The deblocking filter 110,
The subtracter 112,
The adder 113,
The controller 300,
The difference image cost calculator 301,
The predicted image generator 302,
The cost calculator 303,
The vector cost calculator 304,
The vector cost calculator 904,
The cost comparator/vector selector 305,
The predicted vector generator 306,
The switcher 307
The vector transform unit 1108,
The input image transform unit 1109, and
The reference image transform unit 1112.

The components included in the second group listed below can be implemented with the memory 1002 or the storage device 1003 such as a hard disk device, included in the computer 1000. The second group includes:

The frame buffer 111,
The input image memory 200,
The reference image memory 201, The motion vector memory 203,
The motion vector memory 203A,
The motion vector memory 203B,
The transformed input image memory 1110, and
The transformed reference image memory 1111.

Alternatively, some or all of the components included in the first and second group listed above can be implemented by specialized circuits with which the functions of the components are implemented.

While the present invention has been described with reference to exemplary embodiments thereof, the present invention is not limited to the exemplary embodiment described above. Various modifications which are apparent to those skilled in the art can be made to the configurations and details of the present invention within the scope of the present invention.

This application is based upon and claims the benefit of priority from the prior Japanese Patent Application No. 2014-004777, filed on Jan. 15, 2014, the entire disclosure of which is incorporated herein.

REFERENCE SIGNS LIST

1 Video encoder
1A Video encoder
1B Video encoder
1C Video encoder
10 Motion vector searching apparatus
10A Motion vector searching apparatus
10B Motion vector searching apparatus
10C Motion vector searching apparatus
100 Motion estimation unit
101 Motion compensation unit
102 Intra prediction mode determination unit
103 Intra prediction unit
104 Selector
105 Discrete integer transform unit
106 Quantize unit
107 Inverse quantization unit
108 Inverse discrete integer transform unit
109 Variable-length coding unit
110 Deblocking filter
111 Frame buffer
112 Subtracter
113 Adder
200 Input image memory
201 Reference image memory
202 Motion vector memory
203 Motion vector memory
203A Motion vector memory
203B Motion vector memory
300 Controller
301 Difference image cost calculator
302 Predicted image generator
303 Cost calculator
304 Vector cost calculator
305 Cost comparator/vector selector
306 Predicted vector generator
307 Switcher
308 Cost calculating unit
904 Vector cost calculator
908 Cost calculating unit
1000 Computer
1001 Processor
1002 Memory
1003 Storage device
1004 I/O interface
1005 Storage medium
1108 Vector transform unit
1109 Input image transform unit
1110 Transformed input image memory
1111 Transformed reference image memory
1112 Reference image transform unit

What is claimed is:

1. A motion vector searching apparatus comprising:
a memory that stores a set of instructions, and stores, for each of blocks into which an input image is divided, a first motion vector selected as a motion vector that is a vector from a position of a region of a reference image to a position of a block, the region being related with the block; and
at least one processor configured to execute the set of instructions to:
generate candidate vectors on a basis of a predetermined search area;
calculate evaluation values each indicating ratings of the generated candidate vectors on a basis of the first motion vector for each of adjacent blocks, the generated candidate vectors, the input image and the reference image, the adjacent blocks being the blocks that are included in the input image and located around an object block;
select as a second motion vector of the object block a candidate vector based on the ratings in evaluation by the evaluation values from among the candidate vectors;
store the selected second motion vector in a motion vector memory; and
calculate, when a search step of selecting the second motion vector for each of the blocks included in the input image on a basis of the first motion vector ends, the evaluation values by using the second motion vector stored in the motion vector memory as a new first motion vector, on a basis of the new first motion vector as the first motion vector, the input image, the reference image and the candidate vectors.

2. The motion vector searching apparatus according to claim 1, wherein
the at least one processor is configured to:
select, when the search step ends, a new search area which is not wider than the search area in the search step, and generate the candidate vectors on a basis of the selected new search area; and
calculate the evaluation values on a basis of the first motion vector, the input mage, the reference image and the candidate vectors generated on a basis of the new generation area.

3. The motion vector searching apparatus according to claim 1, wherein
the adjacent blocks include a block that is adjacent to and located below the object block and a block that is adjacent to and located to a right of the object block.

4. The motion vector searching apparatus according to claim 1, wherein
the at least one processor is configured to:
determine whether or not the object block is included in reuse blocks, the reuse blocks being the adjacent blocks located in predetermined positions with respect to any one of the blocks for which an omission coding mode is set, the predetermined positions being dependent on the omission coding mode; and
change, when the object block is included in the reuse blocks, an evaluation value of a candidate vector that is equal to the first motion vector of the object block among the evaluation values of the candidate vectors so as to increase the rating.

5. The motion vector searching apparatus according to claim 4, wherein the omission coding mode is a SKIP mode in H.264 or a Merge mode in H.265.

6. The motion vector searching apparatus according to claim 1, wherein
the at least one processor is configured to:
generate a transformed input image by applying an image transform to the input image, the image transform being a predetermined transform that depends on the number of the search steps performed on the input image;
generate a transformed reference image by applying the image transform to the reference image; and
calculate the evaluation value of each of the candidate vectors on a basis of the first motion vector, the candidate vectors, the transformed input image and the transformed reference image.

7. The motion vector searching apparatus according to claim 6, wherein
the image transform is reduction processing which reduces an image on a basis of a reduction ratio specified in accordance with the number of search steps so that a size of the transformed input image does not decreases as the number of search steps increases, and
the at least one processor is configured to:
transform the search area on a basis of the reduction ratio, and generates the candidate vectors on a basis of the transformed search area;
generate a transformed motion vector by transforming the first motion vector on a basis of a transform, the transform adapting a size of a previously transformed input image to the size of an object transformed input image, the previously transformed input image being the transformed input image used for deriving the first motion vector, the object transformed input image being the transformed input image; and
calculate the evaluation value of each of the candidate vectors on a basis of the transformed motion vector, the candidate vectors, the object transformed input image, and the transformed reference image.

8. A motion vector searching method comprising:
generating candidate vectors on a basis of a predetermined search area;
storing, for each of blocks in which an input image is divided, a first motion vector selected as a motion vector that is a vector from a position of a region of a reference image to a position of a block into motion vector storage, the region being related with the block;
calculating evaluation values each indicating ratings of the generated candidate vectors on a basis of the first motion vector for each of adjacent blocks, the generated candidate vectors, the input image and the reference image, the adjacent blocks being the blocks that are included in the input image and located around an object block;
selecting as a second motion vector of the object block a candidate vector based on the ratings in evaluation by the evaluation values from among the candidate vectors;
storing the selected second motion vector in a motion vector memory; and
calculating, when a search step of selecting the second motion vector for each of the blocks included in the input image on a basis of the first motion vector ends, the evaluation values by using the second motion vector stored in the motion vector memory as a new first motion vector, on a basis of the new first motion vector as the first motion vector, the input image, the reference image and the candidate vectors.

9. A non-transitory computer-readable storage medium storing a motion vector searching program causing a computer to execute:
control processing of generating candidate vectors on a basis of a predetermined search area;
motion vector memory processing of storing, for each of blocks into which an input image is divided, a first motion vector selected as a motion vector, the motion vector being a vector from a position of a region of a reference image to a position of a block, the region being related with the block;
cost calculating processing of calculating evaluation values each indicating ratings of the generated candidate vectors on a basis of the first motion vector for each of adjacent blocks, the generated candidate vector, the input image and the reference image, the adjacent blocks being the blocks that are included in the input image and located around an object block;
vector selecting processing of selecting as a second motion vector of the object block a candidate vector based on the ratings in evaluation by the evaluation values from among the candidate vectors;
storage processing of storing the selected second motion vector in a motion vector motion; and
calculation processing of calculating, when a search step of selecting the second motion vector for each of the blocks included in the input image on a basis of the first motion vector ends, the evaluation values by using the second motion vector stored in the motion vector memory as a new first motion vector, on a basis of the new first motion vector as the first motion vector, the input image, the reference image and the candidate vectors.

* * * * *